(12) United States Patent
Terao et al.

(10) Patent No.: US 8,410,751 B2
(45) Date of Patent: Apr. 2, 2013

(54) DEVICE HOUSING A BATTERY AND CHARGING PAD

(75) Inventors: Kyozo Terao, Sumoto (JP); Shoichi Toya, Minamiawaji (JP)

(73) Assignee: Sanyo Electric Co., Ltd., Osaka (JP)

( * ) Notice: Subject to any disclaimer, the term of this patent is extended or adjusted under 35 U.S.C. 154(b) by 343 days.

(21) Appl. No.: 12/814,723

(22) Filed: Jun. 14, 2010

(65) Prior Publication Data

US 2010/0315039 A1 Dec. 16, 2010

(30) Foreign Application Priority Data

Jun. 15, 2009 (JP) ................................. 2009-142793

(51) Int. Cl.
*H02J 7/00* (2006.01)
*H01F 27/28* (2006.01)
*H04M 1/00* (2006.01)

(52) U.S. Cl. ........ 320/108; 320/107; 320/113; 320/115; 320/137; 320/167; 336/230; 336/232; 379/443; 343/856

(58) Field of Classification Search .................. 320/108, 320/115
See application file for complete search history.

(56) References Cited

U.S. PATENT DOCUMENTS

| | | | | |
|---|---|---|---|---|
| 5,617,003 A * | 4/1997 | Odachi et al. | ................. | 320/108 |
| 5,821,731 A * | 10/1998 | Kuki et al. | ................. | 320/108 |
| 7,560,905 B2 * | 7/2009 | Lafontaine | ................. | 320/166 |
| 7,904,171 B2 * | 3/2011 | Parramon et al. | ................. | 607/61 |
| 7,952,322 B2 * | 5/2011 | Partovi et al. | ................. | 320/108 |
| 8,004,235 B2 * | 8/2011 | Baarman et al. | ................. | 320/108 |
| 8,030,887 B2 * | 10/2011 | Jung | ................. | 320/108 |
| 2004/0189246 A1 * | 9/2004 | Bulai et al. | ................. | 320/108 |
| 2008/0048632 A1 * | 2/2008 | Kotani et al. | ................. | 323/293 |
| 2008/0303479 A1 * | 12/2008 | Park et al. | ................. | 320/108 |
| 2009/0096413 A1 * | 4/2009 | Partovi et al. | ................. | 320/108 |
| 2009/0153098 A1 * | 6/2009 | Toya et al. | ................. | 320/108 |
| 2010/0127666 A1 * | 5/2010 | Ball | ................. | 320/152 |

FOREIGN PATENT DOCUMENTS

JP 9-63655 3/1997

OTHER PUBLICATIONS

Shoichi Toya et al., U.S. Appl. No. 12/765,235, filed Apr. 22, 2010, "*Device Housing a Battery and Charging Pad*".

\* cited by examiner

*Primary Examiner* — Drew A Dunn
*Assistant Examiner* — Nathaniel Pelton
(74) *Attorney, Agent, or Firm* — Wenderoth, Lind & Ponack, LLP

(57) ABSTRACT

A device housing a battery (50) includes a receiving coil (51), and a charging pad (10) includes a transmitting coil (11) that magnetically couples with, and supplies charging power to the receiving coil. The device further includes a modulator circuit (61) that changes the impedance of the receiving coil according to internal battery data. The charging pad further includes a detection circuit (17) that detects receiving coil impedance changes to detect the battery data. The modulator circuit has a load circuit (62) connected in parallel with the receiving coil and has a series-connected switching device (64) and impedance modulating capacitor (63), and a control circuit (65) that switches the load circuit switching device ON and OFF according to the battery data. The modulator circuit switches the switching device 64 ON and OFF to transmit battery data to the charging pad.

20 Claims, 10 Drawing Sheets

DEVICE HOUSING A BATTERY AND CHARGING PAD

BACKGROUND OF THE INVENTION

1. Field of the Invention

The present invention relates to a device housing a battery (or batteries) such as a battery pack or mobile telephone, and to a charging pad that transmits power by magnetic induction to the device housing a battery to charge the battery inside.

2. Description of the Related Art

A charging pad (charging stand, charging cradle) has been developed to charge a battery housed in a device by transmitting power from a transmitting coil (power supply coil, primary coil) to a receiving coil (induction coil, secondary coil) by magnetic induction. (Refer to Japanese Laid-Open Patent Publication H09-63655 (1997).)

JP H09-63655A cites a configuration with a charging pad housing a transmitting coil driven by an alternating current (AC) power source, and a battery pack containing a receiving coil that magnetically couples with the transmitting coil.

The battery pack houses circuitry to rectify AC power induced in the receiving coil and supply the rectified power to charge the battery. With this system, a battery pack can be placed on the charging pad to charge the battery pack battery without direct physical contact.

SUMMARY OF THE INVENTION

In a system as described in JP H09-63655A, which magnetically couples a transmitting coil and receiving coil to transmit battery charging power, it is necessary to transmit the fact that battery charging has been completed from the battery-side to the power supply-side to stop the supply of power to the transmitting coil and terminate battery charging. During battery charging as well, by transmitting battery information such as battery voltage, charging current, and temperature, charging can be performed under ideal conditions. The receiving coil on the battery-side can be magnetically excited when battery full-charge is detected, and the magnetic field resulting from receiving coil excitation can be detected by a sensor provided on the power supply-side. This arrangement can transmit battery full-charge information from the battery-side to the battery charging power supply-side. However, this configuration has the drawbacks that the circuit structure to transmit battery information from the battery-side to the power supply-side is complex, and it is difficult to accurately transmit rapidly varying battery data in real-time.

The present invention was developed with the object of further correcting the drawbacks described above. Thus, it is an important object of the present invention to provide a device housing a battery and charging pad that can rapidly transmit battery information to the power supply-side charging pad in real-time while maintaining a simple circuit structure.

The device housing a battery and charging pad of the present invention is made up of a device housing a battery 50, 70, 80 provided with a receiving coil 51 that supplies power to charge the internal battery 52, and a charging pad 10 provided with a transmitting coil 11 that magnetically couples with, and supplies charging power to the receiving coil 51 in the device housing a battery 50, 70, 80. The device housing a battery 50, 70, 80 is provided with a modulator circuit 61, 71, 81 that changes the impedance of the receiving coil 51 according to internal battery 52 data. The charging pad 10 is provided with a detection circuit 17 that detects battery data via the transmitting coil 11 by detecting modulator circuit 61, 71, 81 impedance changes in the receiving coil 51. Further, the modulator circuit 61, 71, 81 is provided with a load circuit 62, 72, 82 that has a switching device 64, 74, 84 connected in series with an impedance modulating capacitor 63 that is connected in parallel with the receiving coil 51, and a control circuit 65, 75, 85 that switches the load circuit 62, 72, 82 switching device 64, 74, 84 ON and OFF according to the battery data. The modulator circuit 61, 71, 81 switching device 64, 74, 84 is switched ON and OFF to transmit battery data to the charging pad 10.

The device housing a battery and charging pad described above has the characteristic that battery information can be rapidly transmitted to the power supply-side charging pad in real-time while maintaining a simple circuit structure. This is because the device housing a battery modulator circuit has an impedance modulating capacitor connected to the receiving coil, and connection of that impedance modulating capacitor is switched ON and OFF by the switching device to transmit battery data to the charging pad. For example, if the modulator circuit switching device is switched ON and then OFF to connect and then disconnect the impedance modulating capacitor and the receiving coil, various parameters in the charging pad transmitting coil change such as transmitting coil voltage, current, phase, and transmission efficiency. The charging pad detection circuit can detect any one of those changing parameters to determine the battery data transmitted from the device housing a battery. Further, since the impedance modulating capacitor is connected to the receiving coil and the change in transmitted current due to the impedance modulating capacitor is small, parameter changes can be detected to determine the battery data while charging the battery.

In the device housing a battery and charging pad of the present invention, the detection circuit 17 can detect receiving coil 51 impedance changes to detect battery information from either transmitting coil 11 voltage changes, current level changes, current-voltage phase relation changes, or transmission efficiency changes. As a result of the circuit structure, the charging pad can accurately detect connection or disconnection of the impedance modulating capacitor to the receiving coil by changes in various transmitting coil parameters.

In the device housing a battery and charging pad of the present invention, a series capacitor 55 can be connected in series with the receiving coil 51. With this circuit structure, battery information can be transmitted while efficiently transmitting power from the transmitting coil to the receiving coil for efficient battery charging. This is because for high current transmission, power transmission is more efficient with a capacitor connected in series with the receiving coil than with a capacitor connected in parallel. Further, power is normally transmitted to the receiving coil with a series-connected capacitor, and the low capacitance impedance modulating capacitor is only connected in parallel for extremely short time periods to transmit battery information.

In the device housing a battery and charging pad of the present invention, the battery information transmitted from the device housing a battery 50, 70, 80 to the charging pad 10 can include any one of the following data: voltage of the battery being charged, charging current, battery temperature, serial number, allowable battery charging current that determines the charging current, and allowable battery temperature that controls battery charging. With this circuit structure, the battery can be charged under favorable conditions while transmitting various battery data from the device housing a battery to the charging pad.

In the device housing a battery and charging pad of the present invention, the device housing a battery 50, 70, 80 can be provided with a rectifying circuit 53 to rectify AC induced in the receiving coil 51 from the transmitting coil 11, and the load circuit 62, 72, 82 can be connected to the input-side of that rectifying circuit 53. With this circuit structure, receiving coil impedance changes can be stably detected for accurate battery data detection at the charging pad independent of the rectifying circuit configuration.

In the device housing a battery and charging pad of the present invention, the rectifying circuit 53 can be either a synchronous rectifying circuit 53A or a diode-bridge circuit 53B. With this circuit structure, AC induced in the receiving coil can be efficiently rectified. Since field-effect transistors (FETs) of a synchronous rectifying circuit switch in phase with the AC power, battery short-circuit current flow can be reduced for accurate battery data transmission. This is because even when FETs that conduct in both directions in the ON state connect the impedance modulating capacitor in parallel with the battery, battery short-circuit current flow due to the impedance modulating capacitor is reduced. Further, with a diode-bridge rectifying circuit, a simple circuit structure can be maintained while reducing battery short circuit current flow to allow battery data transmission during charging.

In the device housing a battery and charging pad of the present invention, the charging pad 10 can be provided with a case 20 having a charging region where a device housing a battery 50, 70, 80 can be placed in a removable manner, a moving mechanism 13 that moves the transmitting coil 11 close to the receiving coil 51, and a position detection controller 14, 44 that detects the position of the receiving coil 51 in a device housing a battery 50, 70, 80 placed in the charging region and controls the moving mechanism 13 to move the transmitting coil 11 close to the receiving coil 51. The position detection controller 14, 44 can be provided with position detection coils 30 fixed to the top plate 21 of the case 20, a detection signal generating circuit 31 that supplies position detection signals to the position detection coils 30, a receiving circuit 32 that receives echo signals output from the receiving coil 51 to the position detection coils 30 resulting from excitation of the receiving coil 51 by position detection signals supplied to the position detection coils 30 from the detection signal generating circuit 31, and a discrimination circuit 33, 43 that determines receiving coil 51 position from the echo signals received by the receiving circuit 32. The device housing a battery 50, 70, 80 can be provided with a rectifying circuit 53 connected to the receiving coil 51 to convert AC power induced in the receiving coil 51 to direct current (DC) to supply the internal battery 52 with charging power, and a series capacitor 55 connected in series with the receiving coil 51. When the position detection controller 14, 44 is issuing position detection signals, the modulator circuit 61, 71, 81 control circuit 65, 75, 85 can switch the switching device 64, 74, 84 ON to connect the impedance modulating capacitor 63 to the receiving coil 51.

With this circuit structure, the impedance modulating capacitor used for transmitting battery data can serve the dual purpose as the capacitor connected in parallel with the receiving coil for detecting the position of the device housing a battery. From a different perspective, the capacitor provided for accurate detection of the position of the device housing a battery can transmit the battery information. Consequently, in a device that connects a capacitor to the receiving coil to detect the position of the device housing a battery, a special-purpose capacitor for battery data transmission and a switching device to connect that capacitor to the receiving coil are unnecessary, and this system is characterized by modulating the switching device according to the battery data to transmit the battery data to the charging pad.

In the device housing a battery and charging pad of the present invention, the load circuit 72 can be provided with a pair of series-connected switching devices 74X, and impedance modulating capacitors 63 connected in series with each of the two switching devices 74X. Further, the connection node of the two switching devices 74X can be connected to the ground line 78, and the pair of switching devices 74X can be controlled ON and OFF simultaneously by the control circuit 75. With this circuit structure, the switching devices can be switched ON and OFF to transmit battery information and accurately detect receiving coil position without a common ground line connection between the receiving coil and the rectifying circuit. This system has the characteristic that during battery charging, power efficiency is increased allowing efficient battery charging.

The above and further objects of the present invention as well as the features thereof will become more apparent from the following detailed description to be made in conjunction with the accompanying drawings.

DETAILED DESCRIPTION OF THE EMBODIMENT(S)

The following describes embodiments of the present invention based on the figures.

Figure 1:
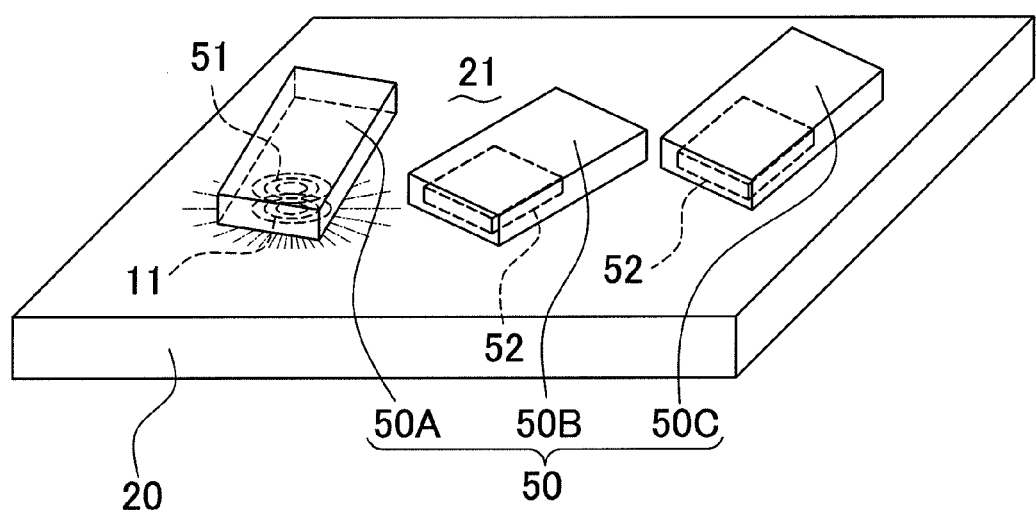
FIG. 1 is an oblique view of the charging pad of an embodiment of the present invention.
Figure 2:
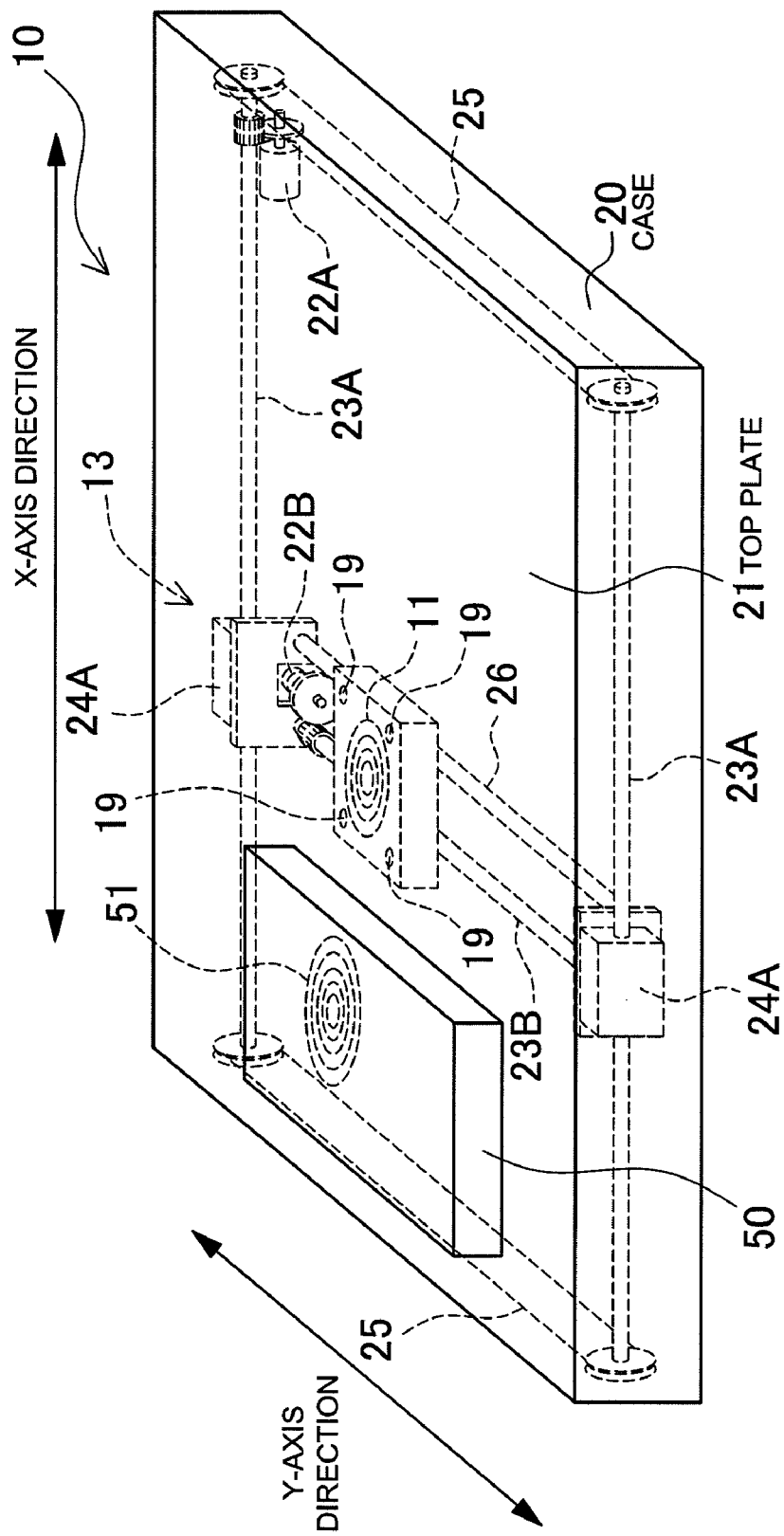
FIG. 2 is an abbreviated oblique view showing the internal structure of the charging pad shown in FIG. 1.
Figure 6:
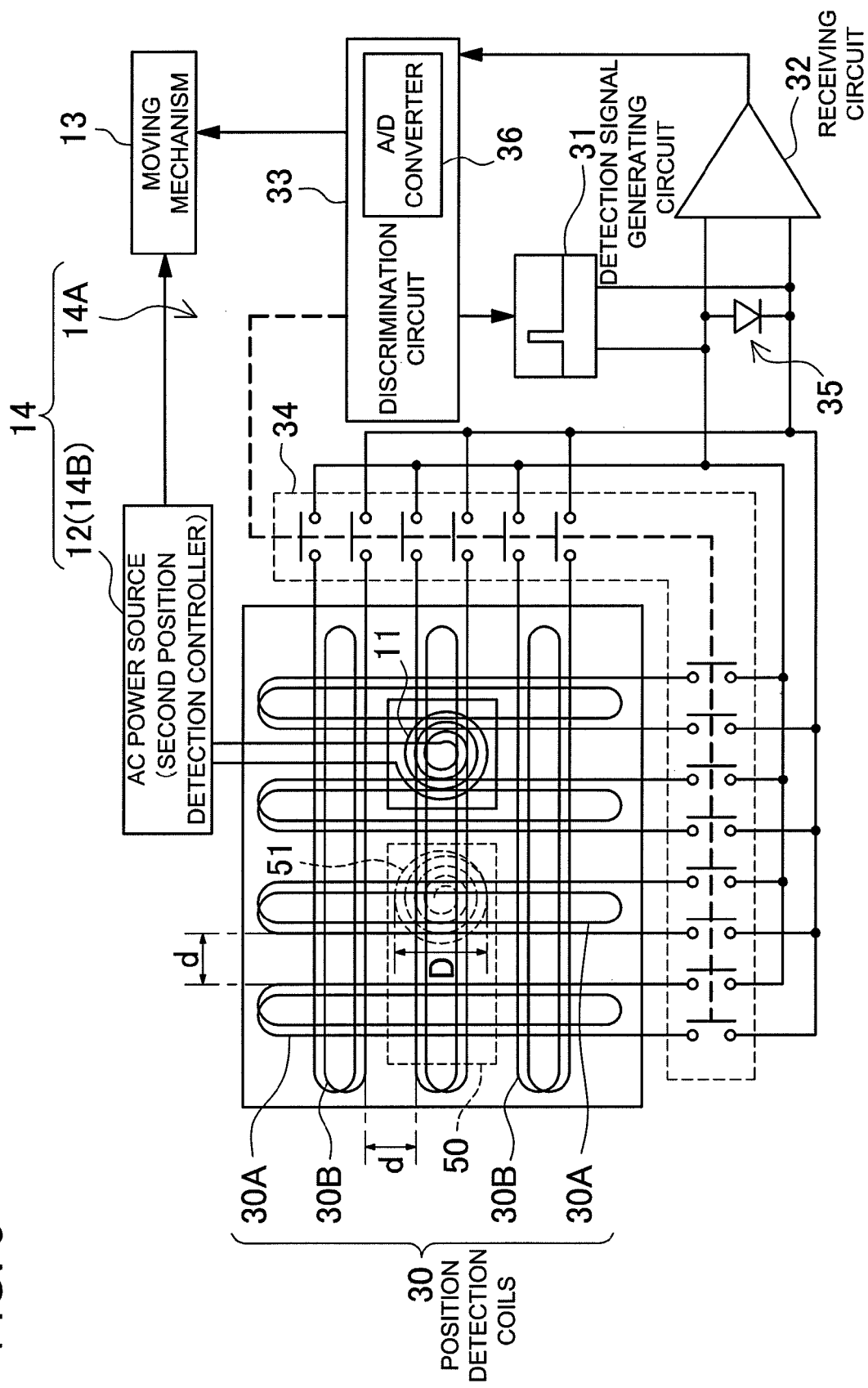
FIG. 6 is a circuit diagram showing the position detection controller of the charging pad of an embodiment of the present invention.
Figure 7:
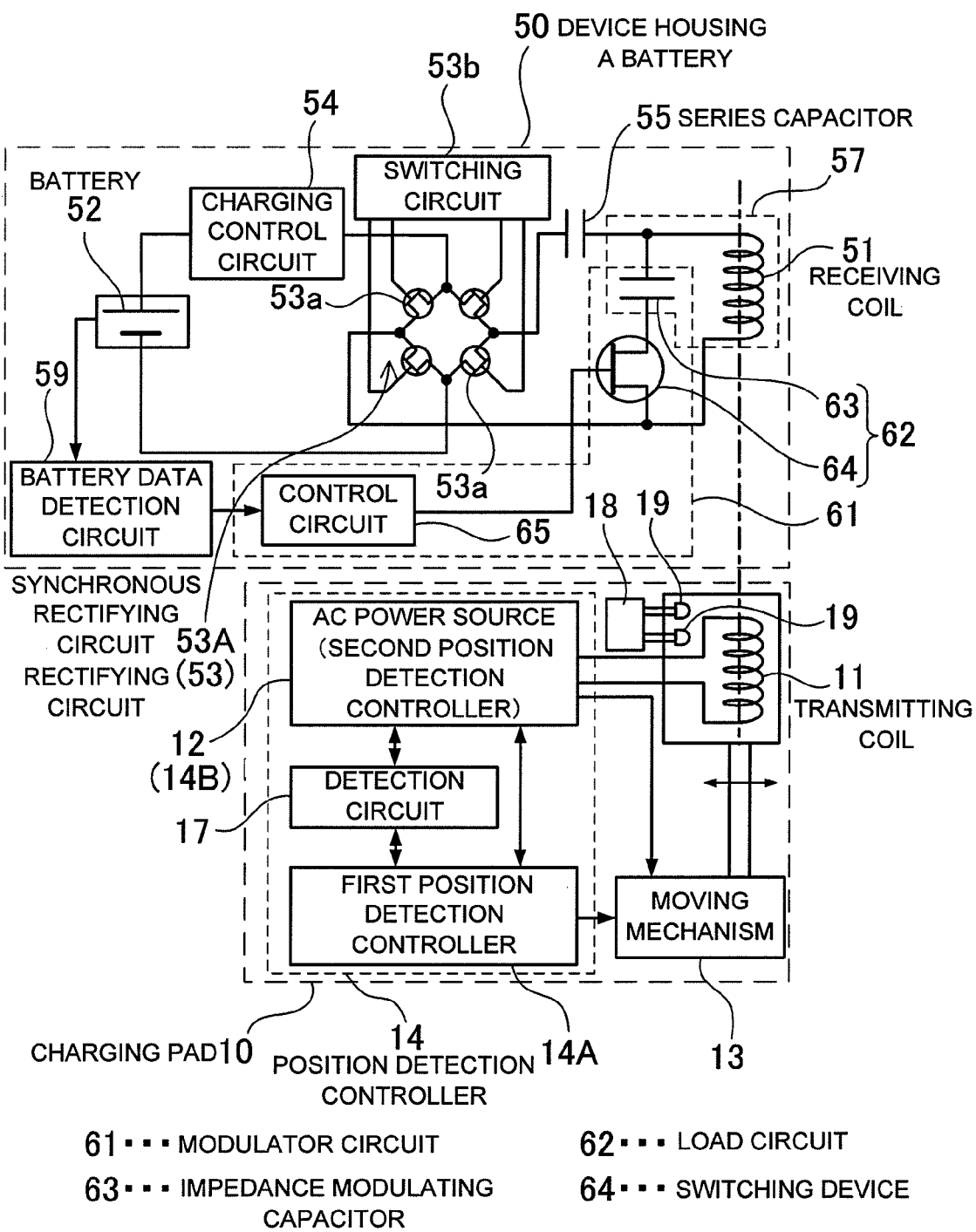
FIG. 7 is a block diagram of a device housing a battery and charging pad of an embodiment of the present invention.

FIGS. 1-7 are schematic and diagrammatic views illustrating the structure and operating principles of the charging pad 10. As shown in FIGS. 1, 2, and 7, devices housing a battery 50 are placed on the charging pad 10, and the internal battery 52 is charged utilizing magnetic induction. A device housing a battery 50 contains a receiving coil 51 that magnetically couples with the transmitting coil 11, and a battery 52 that is charged by power induced in the receiving coil 51.

The device housing a battery 50 is provided with a modulator circuit 61 that changes the impedance of the receiving coil 51 according to internal battery 52 information. The charging pad 10 is provided with a detection circuit 17 that detects receiving coil 51 impedance changes made by the modulator circuit 61 to detect battery information via the transmitting coil 11.

The modulator circuit 61 is provided with a load circuit 62 having a switching device 64 connected in series with an impedance modulating capacitor 63 that is connected in parallel with the receiving coil 51, and a control circuit 65 that switches the load circuit 62 switching device 64 ON and OFF according to the battery information. The control circuit 65 switches the switching device 64 ON and OFF to transmit battery information to the charging pad 10. The control circuit 65 controls the switching device 64 with digital signals to transmit battery information such as the voltage of the battery being charged, charging current, battery temperature, battery serial number, allowable battery charging current that determines the charging current, and allowable battery temperature that controls battery charging. The device housing a battery 50 is provided with a battery data detection circuit 59 that detects internal battery 52 information. The battery data detection circuit 59 detects battery information such as battery voltage, charging current, and battery temperature, and inputs it to the control circuit 65. The control circuit 65 repeatedly transmits battery information with a given period. Specifically, a time interval for battery information transmission and a time interval with no transmission are continually repeated with a given period. This period is set, for example, from 0.1 sec to 5 sec and preferably from 0.1 sec to 1 sec. Since battery voltage, current, and temperature change during charging, battery data such as these parameters are repeatedly transmitted with the period described above. However, battery data such as the battery serial number, the allowable battery charging current that determines the charging current, and the allowable battery temperature that controls battery charging are transmitted once at the beginning of charging, and subsequent repeated transmission is unnecessary. The modulator circuit 61 switches the switching device 64 ON and OFF with digital signals to modulate the capacitance in parallel with the receiving coil 51 and transmit battery information in accordance with the transmission timing. For example, the control circuit 65 in the modulator circuit 61 can control the switching device 64 ON and OFF at a rate of 1000 bps to transmit the battery information. However, the control circuit 65 can also transmit battery information at a rate from 500 bps to 5000 bps. After battery information is transmitted at 1000 bps during the time interval for transmission, battery data transmission is stopped during the time interval with no transmission and battery charging is performed under normal conditions. During the transmission time interval, the switching device 64 is switched ON and OFF. Switching connects the impedance modulating capacitor 63 to the receiving coil 51 for battery data transmission. As a result of parallel connection of the impedance modulating capacitor 63 to the receiving coil 51, conditions for power transmission from the transmitting coil 11 to the receiving coil 51 are slightly degraded from the design conditions for optimum power transmission efficiency. However, the time interval for data transmission is short compared to the time interval with no transmission, and during the transmission time interval, the time that the impedance modulating capacitor 63 is connected to the receiving coil 51 is extremely short. Consequently, even though transmission efficiency is degraded by connection of the impedance modulating capacitor 63 to the receiving coil 51, this degradation over the total charging power transmission time is at a level that can be essentially neglected.

The charging pad 10 detection circuit 17 detects receiving coil 51 impedance changes by changes in transmitting coil 11 voltage levels, and detects battery information from the impedance changes. Since the transmitting coil 11 is magnetically coupled with the receiving coil 51, transmitting coil 11 voltage levels change when the receiving coil 51 impedance changes. Since transmitting coil 11 voltage level changes are synchronous with switching device 64 ON and OFF switching, switching device 64 ON and OFF switching can be detected by the changes in transmitting coil 11 voltage levels. Since the modulator circuit 61 switches the switching device 64 ON and OFF with digital signals representing the battery data, the discharge circuit 17 can detect the battery data digital signals by detecting ON and OFF switching of the switching device 64. Consequently, the detection circuit 17 can detect battery information such as the voltage of the battery being charged, charging current, and battery temperature from the detected digital signals.

However, the detection circuit 17 can also detect battery information from changes in transmitting coil 11 current levels, from the phase relation between the current and voltage, or from changes in the transmission efficiency. This is because these parameters change as a result of changes in the receiving coil 51 impedance.

Figure 3:
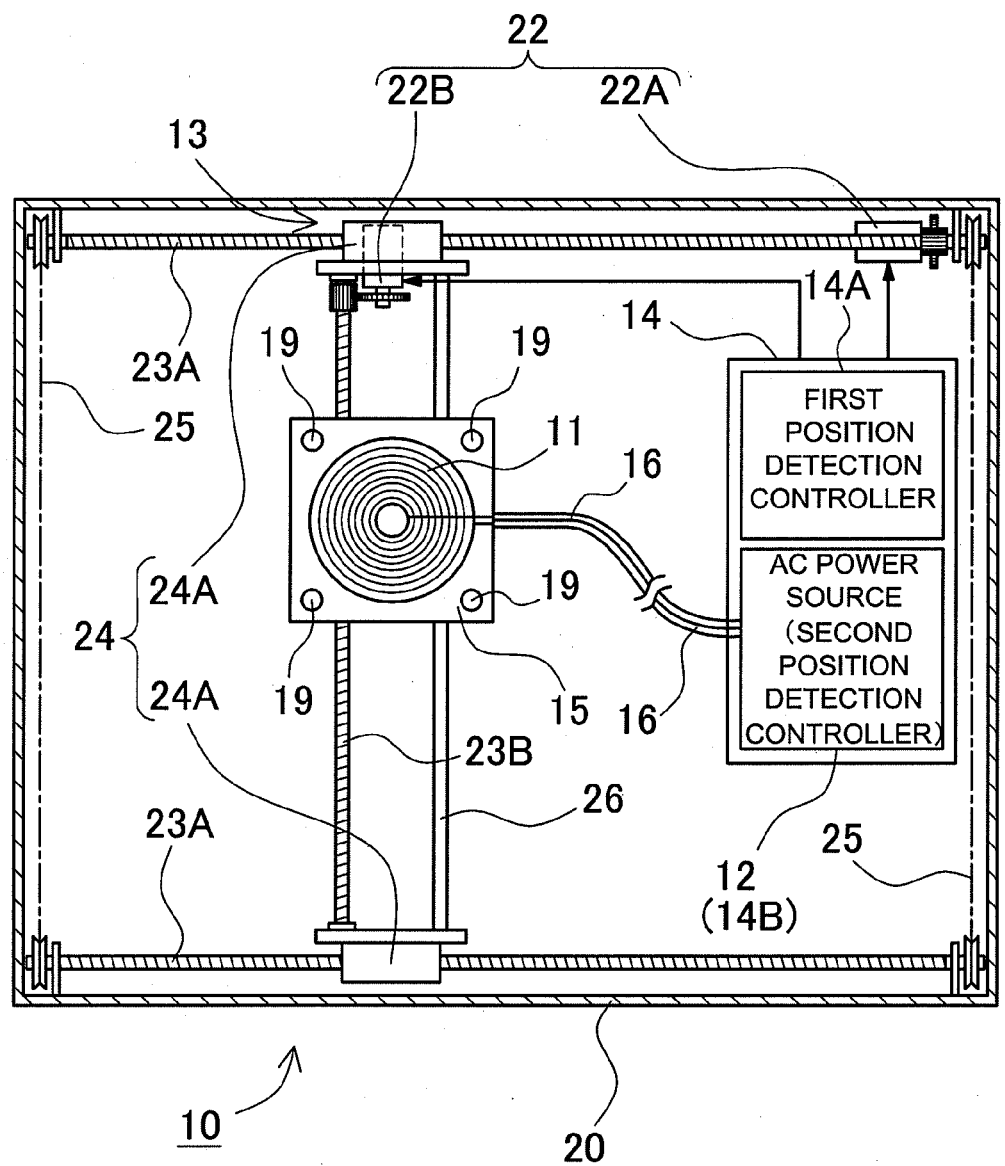
FIG. 3 is a horizontal cross-section view showing the internal structure of the charging pad shown in FIG. 1.
Figure 4:
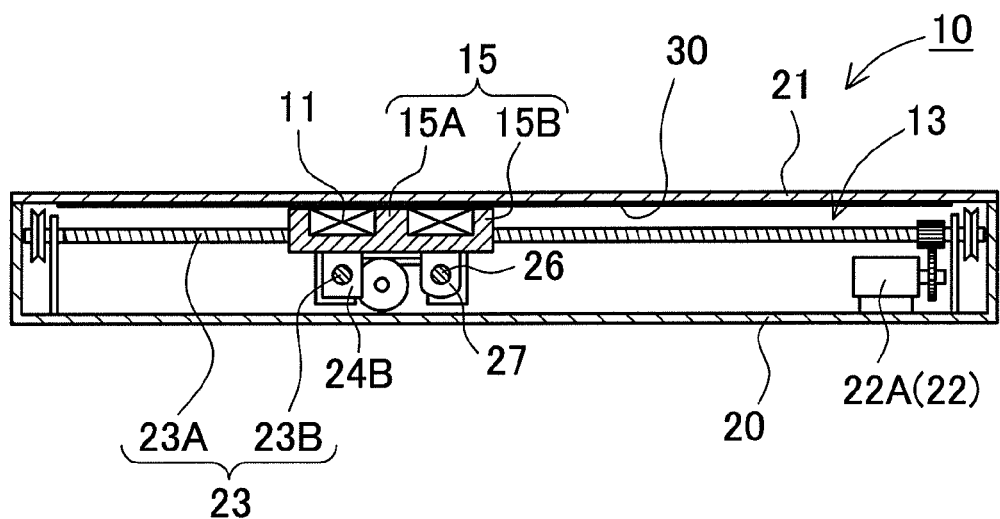
FIG. 4 is a lengthwise vertical cross-section view of the charging pad shown in FIG. 3
Figure 5:
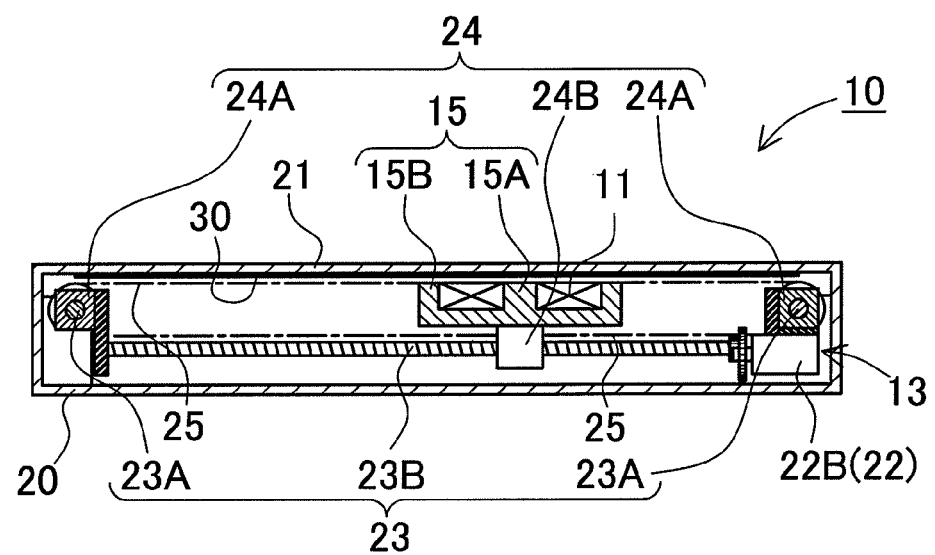
FIG. 5 is a widthwise vertical cross-section view of the charging pad shown in FIG. 3

In the charging pad 10 shown in FIGS. 1 and 2, a device housing a battery 50 is placed on the top plate 21 to charge the internal battery 52. As shown in FIG. 3, the charging pad 10 houses systems to put the transmitting coil 11 in close proximity to the receiving coil 51 in the device housing a battery 50 for efficient charging of the internal battery 52. To detect the position of the receiving coil 51, the charging pad 10 is provided with a position detection controller 14.

FIG. 7 is a circuit diagram showing the charging pad 10 and the device housing a battery 50 that is placed on the charging pad 10. The charging pad 10 is provided with a position detection controller 14 to detect the position of the receiving coil 51. FIG. 6 shows a block diagram of the position detection controller 14. The position detection controller 14 is provided with a plurality of position detection coils 30 fixed to the inside of the top plate 21 of the charging pad 10 case 20, a detection signal generating circuit 31 that supplies position detection signals to the position detection coils 30, a receiving circuit 32 that receives echo signals output from the receiving coil 51 to the position detection coils 30 as a result of receiving coil 51 excitation by position detection signals supplied to the position detection coils 30 from the detection signal generating circuit 31, and a discrimination circuit 33 that determines receiving coil 51 position from the echo signals received by the receiving circuit 32.

The position detection controller 14 described above detects the position of the receiving coil in the following manner.

(1) The detection signal generating circuit 31 outputs a pulse detection signal to a position detection coil 30.

Figure 10:
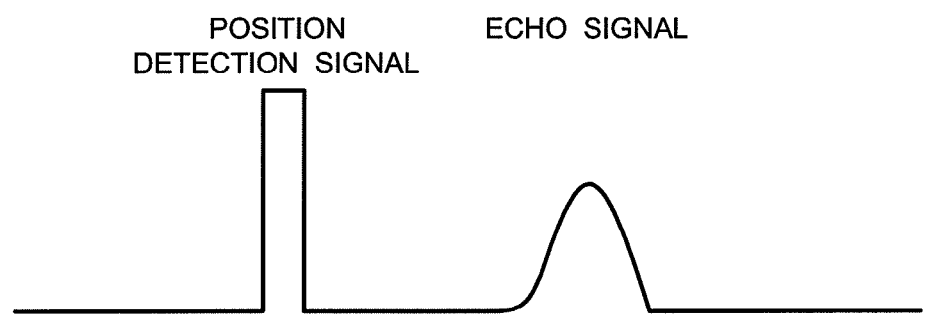
FIG. 10 is a waveform diagram showing an example of an echo signal output from the parallel resonant circuit excited by a position detection signal.

(2) The receiving coil 51 is excited by the position detection coil 30, which is supplied with the pulse detection signal. As shown in FIG. 10, an echo signal is output from the receiving coil 51 to the position detection coil 30.

(3) The receiving circuit 32 receives the echo signal.

(4) Each of the plurality of position detection coils 30 is sequentially switched to output a pulse detection signal and receive an echo signal.

(5) The discrimination circuit 33 detects the position of the receiving coil 51 by detecting the amplitude of the echo signal induced in each position detection coil 30. The amplitude of the echo signal in a position detection coil 30 close to the receiving coil 51 is high, and echo signal amplitude drops off as the position of the receiving coil 51 becomes further away from the detection coil 30. Consequently, the discrimination circuit 33 can determine the receiving coil 51 position from echo signal amplitude. The position detection controller 14 of FIG. 6 has position detection coils 30 disposed in the X-axis direction and Y-axis direction. The position of the receiving coil 51 in the X-axis direction is determined by X-axis detection coils 30A, and the position of the receiving coil 51 in the Y-axis direction is determined by Y-axis detection coils 30B.

As shown in the circuit diagram of FIG. 7, a parallel resonant circuit 57 is formed by connecting the impedance modulating capacitor 63 in parallel with the receiving coil 51, and the position detection controller 14 triggers resonance with a pulse signal causing an echo signal to be generated. However, the impedance modulating capacitor 63 connected in parallel with the receiving coil 51 slightly lowers the power efficiency when the internal battery 52 is charged by power induced in the receiving coil 51.

The device housing a battery 50 is provided with a rectifying circuit 53 connected to the receiving coil 51 to convert AC power induced in the receiving coil 51 to DC to supply the battery 52 with charging power, a series capacitor 55 connected in series with the receiving coil 51 to input receiving coil 51 AC to the rectifying circuit 53, an impedance modulating capacitor 63 connected in parallel with the receiving coil 51, and a switching device 64 that switches the connection of the series capacitor 55, the impedance modulating capacitor 63, and the receiving coil 51. When the position detection controller 14 is issuing position detection signals, the device housing a battery 50 switching device 64 connects the impedance modulating capacitor 63 to the receiving coil 51. When power is transmitted from the transmitting coil 11 to the receiving coil 51, the impedance modulating capacitor 63 is disconnected from the receiving coil 51, and AC power is output from the receiving coil 51 to the rectifying circuit 53 through the series capacitor 55.

The device housing a battery 50 and charging pad 10 described above have the characteristic that while a parallel resonant circuit 57 is normally connected for accurate location of the receiving coil 51, the impedance modulating capacitor 63 is disconnected during battery charging to allow the internal battery to be charged in a power efficient manner. This is because during detection of the receiving coil 51 position, echo signal generation depends on connection of the impedance modulating capacitor 63 to the receiving coil 51. Further, during internal battery 52 charging, power efficient battery charging depends on disconnection of the parallel-connected impedance modulating capacitor 63 to allow receiving coil 51 power to be output to the rectifying circuit 53 through the series-connected capacitor. Power efficiency during charging is improved by a circuit configuration that connects a series capacitor 55 to the receiving coil 51 compared to low-current transmission configurations with a capacitor connected in parallel with the receiving coil. With the configuration described above, coil and battery heat generation during charging can be controlled, and the internal battery can be charged efficiently, rapidly, and safely.

Here, the impedance modulating capacitor 63 connected in parallel with the receiving coil 51, the switching device 64 that connects the impedance modulating capacitor 63 to the receiving coil 51, and the control circuit 65 that controls the switching device 64 ON and OFF are provided, and the switching device 64 is switched ON when the position detection controller 14 detects receiving coil 51 position. With a device housing a battery 50 having this circuit configuration, the impedance modulating capacitor 63, switching device 64, and control circuit 65 provided in conjunction with the position detection controller 14 can also be used to transmit battery information. This is because the control circuit 65 can switch the switching device 64 ON and OFF according to battery information in digital signal form to change the load impedance of the receiving coil 51. Consequently, this device housing a battery 50 can transmit battery information without providing special-purpose circuitry for battery data transmission. Specifically, the same hardware can be utilized by only changing the software for control circuit 65 ON and OFF switching of the switching device 64. The software can be stored in memory provided in the control circuit 65. As a result, this device housing a battery 50 can transmit battery data to the charging pad 10 under ideal conditions without increasing manufacturing cost.

Figure 8:
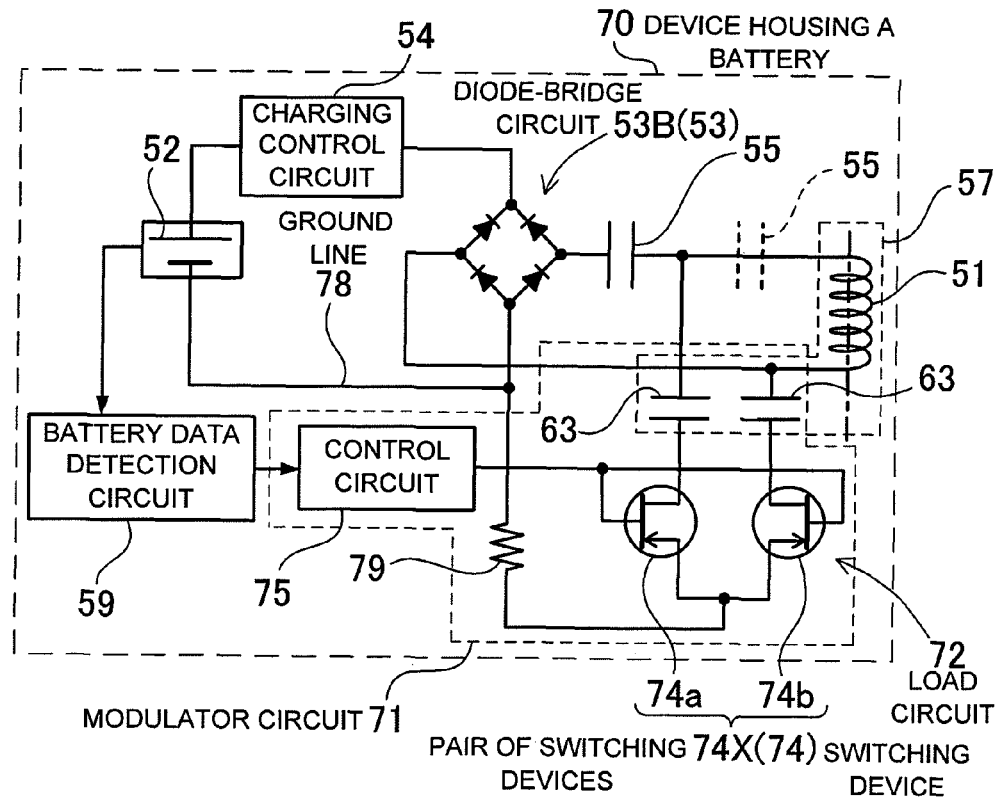
FIG. 8 is a block diagram showing an example of another device housing a battery.
Figure 9:
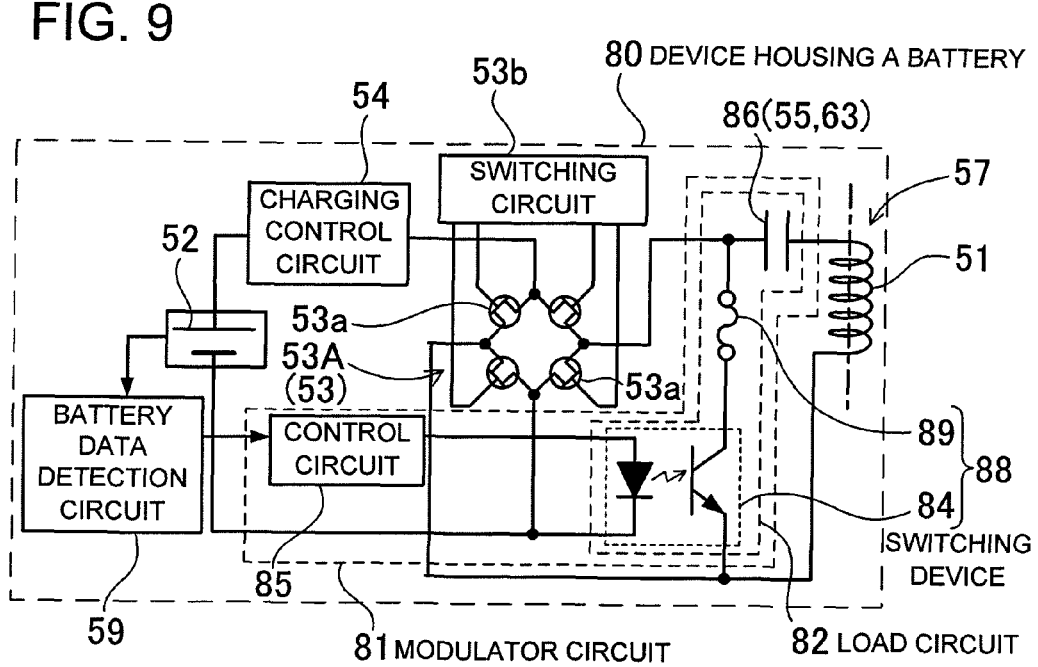
FIG. 9 is a block diagram showing an example of another device housing a battery.

The device housing a battery 50, 70, 80 shown in FIGS. 7-9 is provided with a rectifying circuit 53 connected to the receiving coil 51 that converts AC induced in the receiving coil 51 to DC to supply charging power to the internal battery 52. The rectifying circuit 53 converts AC input from the receiving coil 51 to DC and outputs that DC power to a charging control circuit 54 that controls internal battery 52 charging. The rectifying circuit 53 of FIGS. 7 and 9 is a synchronous rectifying circuit 53A. The synchronous rectifying circuit 53A is provided with four FETs connected in a bridge configuration, and a switching circuit 53b that switches each of the FETs ON an OFF. The switching circuit 53b switches the FETs 53a synchronous with the AC output from the receiving coil 51 to convert the input AC to DC output. Since FET 53a voltage drop is less than diode voltage drop, the synchronous rectifying circuit 53A has the characteristic that AC can be rectified with reduced power loss due to voltage drops. However, as shown in FIG. 8, a diode-bridge circuit 53B can also clearly be used in place of the synchronous rectifying circuit as the rectifying circuit 53. The charging control circuit 54 fully charges the internal battery 52 with power input from the rectifying circuit 53. The charging control circuit 54 detects full-charge of the internal battery 52 and stops charging. A charging control circuit 54 for a lithium ion internal battery 52 charges the battery 52 to full-charge by constant voltage-constant current charging. A charging control circuit for a nickel hydride internal battery charges the battery to full-charge by constant current charging.

The device housing a battery 50, 70, 80 of FIGS. 7-9 is provided with the series capacitor 55 connected in series with the receiving coil 51 to efficiently input receiving coil 51 AC to the rectifying circuit 53, the impedance modulating capacitor 63 connected in parallel with the receiving coil 51, and the switching device 64, 74, 84 that switches connection of the series capacitor 55, the impedance modulating capacitor 63, and the receiving coil 51.

When position detection signals are output from the position detection controller 14, the switching device 64, 74, 84 connects the impedance modulating capacitor 63 to the receiving coil 51. The receiving coil 51 and impedance modulating capacitor 63 form a parallel resonant circuit 57 that is excited by position detection signals issued from the position detection controller 14 position detection coils 30 to generate echo signals. Resonance resulting in echo signal generation cannot be achieved by receiving coil 51 connection to a series capacitor 55 alone, and connection of the impedance modulating capacitor 63 is necessary. Therefore, when the device housing a battery 50, 70, 80 is placed on the charging pad 10 and the position detection controller 14 is determining the position of the device housing a battery 50, 70, 80, the switching device 64, 74, 84 connects the impedance modulating capacitor 63 to the receiving coil 51.

However, a receiving coil 51 connected to an impedance modulating capacitor 63 has the drawback that power efficiency is reduced because the induced power cannot be efficiently output to the rectifying circuit 53. The power efficiency for power transferred from the receiving coil 51 to the rectifying circuit 53 is improved with connection of the series capacitor 55 compared to the parallel impedance modulating capacitor 63. Consequently, after the receiving coil 51 position has been detected and the transmitting coil 11 has been moved close to the receiving coil 51, the switching device 64, 74, 84 connects the series capacitor 55 to the receiving coil 51 to output induced power from the receiving coil 51 to the rectifying circuit 53. Specifically, when the transmitting coil 11 transmits power to the receiving coil 51, the switching device 64, 74, 84 disconnects the impedance modulating capacitor 63 from the receiving coil 51 to leave the series capacitor 55 connected instead. In this configuration, AC induced in the receiving coil 51 is output to the rectifying circuit 55 through the series capacitor 55.

The device housing a battery 50 shown in FIG. 7 is provided with the load circuit 62 made up of the impedance modulating capacitor 63, and the switching device 64 connected in series with the impedance modulating capacitor 63. The series-connected impedance modulating capacitor 63 and switching device 64 are connected in parallel with the receiving coil 51. The switching device 64 is a semiconductor switching device such as a FET that is controlled ON and OFF by the control circuit 65. When the switching device 64 is in the ON state, the impedance modulating capacitor 63 is connected in parallel with the receiving coil 51. When the switching device 64 is in the OFF state, the impedance modulating capacitor 63 is disconnected from the receiving coil 51. The series capacitor 55 is connected in series with the receiving coil 51 and connects the receiving coil 51 to the rectifying circuit 53.

The control circuit 65 controls the gate voltage of the FET, which is the switching device 64, to switch the switching device 64 ON and OFF. When the position of the receiving coil 51 is being detected, the control circuit 65 holds the switching device 64 in the ON state to connect the impedance modulating capacitor 63 to the receiving coil 51. The receiving coil 51 connected in parallel with the impedance modulating capacitor 63 outputs a large amplitude echo signal when excited by a position detection signal from a position detection coil 30. Even with the switching device 64 in the ON state, the series capacitor 55 is connected between the receiving coil 51 and the rectifying circuit 53. However, with the switching device 64 in the ON state, the receiving coil 51 is connected in parallel with the impedance modulating capacitor 63 to establish a parallel resonant circuit 57 that outputs a large amplitude echo signal when excited by a position detection signal.

After the receiving coil 51 position has been detected and the transmitting coil 11 has been moved close to the receiving coil 51, the control circuit 65 switches the switching device 64 OFF to disconnect the impedance modulating capacitor 63 from the receiving coil 51. Specifically, when power is transmitted from the transmitting coil 11 to the receiving coil 51, the control circuit 65 holds the switching device 64 in the OFF state to disconnect the impedance modulating capacitor 63 from the receiving coil 51. In this configuration, AC power induced in the receiving coil 51 is efficiently output to the rectifying circuit 53 through the series capacitor 55.

The switching device 74 of FIG. 8 is provided with a pair of switching devices 74X that are connected in series. The two switching devices 74X of the figure are semiconductor switching devices such as FETs. The pair of FETs 74a, 74b have their sources connected together to connect the devices in series. In addition, the connection node of the pair of switching devices 74X, which is the sources of the two FETs, is connected to the ground line 78 through a high resistance resistor 79 (for example, 100 KΩ) to put the connection node essentially at ground potential. An impedance modulating capacitor 63 is connected in series with each of the two switching devices 74X. Each of the FETs 74a, 74b, which are the pair of switching devices 74X, is connected to an end of the receiving coil 51 through a drain-connected impedance modulating capacitor 63. The switching device 74 of this figure connects the series-connection of an impedance modulating capacitor 63, FET 74a, FET 74b, and another impedance modulating capacitor 63 in parallel with the receiving coil 51.

The series capacitor 55 can be connected on the rectifying circuit 53 side of the impedance modulating capacitor 63 as shown by the solid lines of the figure, or as shown by the broken lines, it can also be connected between the impedance modulating capacitor 63 and the receiving coil 51. A series capacitor 55 connected between the impedance modulating capacitor 63 and the receiving coil 51 is connected in series with the impedance modulating capacitor 63 when the switching devices 74X are in the ON state. Consequently, the total capacitance connected to the receiving coil 51 to form the parallel resonant circuit 57 is equivalent to the series combination of the series capacitor 55 and the two impedance modulating capacitors 63.

The two FETs 74a, 74b of the pair of switching devices 74X are switched ON and OFF together by the control circuit 75. The control circuit 75 controls the gate voltages of both FETs in the same manner to simultaneously switch the pair of switching devices 74X ON and OFF. The control circuit 75 connects the impedance modulating capacitors 63 in parallel with the receiving coil 51 by switching the pair of FET switching devices 74X to the ON state. When the control circuit 75 switches the pair of switching devices 74X to the OFF state, the impedance modulating capacitors 63 are disconnected from the receiving coil 51.

When the position of the receiving coil 51 is being detected, the control circuit 75 described above holds the pair of switching devices 74X in the ON state to connect the impedance modulating capacitors 63 to the receiving coil 51. The receiving coil 51 connected in parallel with the impedance modulating capacitors 63 outputs an echo signal when excited into parallel resonance by a position detection signal from a position detection coil 30.

After the receiving coil 51 position has been detected and the transmitting coil 11 has been moved close to the receiving coil 51, the control circuit 75 switches the pair of switching devices 74X OFF to disconnect the impedance modulating capacitors 63 from the receiving coil 51. Specifically, when power is transmitted from the transmitting coil 11 to the receiving coil 51, the control circuit 75 holds the pair of switching devices 74X in the OFF state to disconnect the impedance modulating capacitors 63 from the receiving coil 51. In this configuration, AC power induced in the receiving coil 51 is efficiently output to the rectifying circuit 53 through the series capacitor 55.

In the switching device 74 of FIG. 8, since one side (source side) of the pair of switching devices 74X is essentially at ground, the circuit structure of the control circuit 75 can be simplified. In particular, when the rectifying circuit 53 is a diode-bridge 53B, neither end of the receiving coil 51 is at ground potential. Specifically, the receiving coil 51 is connected to the ground line 78 through the diodes. In this case, the circuit structure of the control circuit 75 that controls the pair of switching devices 74X ON and OFF can be simplified.

Further, the device housing a battery 80 of FIG. 9 has a series capacitor 55 and impedance modulating capacitor 63 that are a single capacitor 86. In this device housing a battery 80, the switching device 84 switches the capacitor 86 to use it as a series capacitor 55 or as an impedance modulating capacitor 63. The capacitor 86 is connected between the receiving coil 51 and the rectifying circuit 53. The switching device 84 is a shorting circuit 88 that short circuits the rectifying circuit 53 side of the capacitor 86. The shorting circuit 88 is made up of a resistance device 89 such as a positive temperature coefficient (PCT) thermistor and a switching device 84, and the switching device 84 is controlled ON and OFF by a control circuit 85. The switching device 84 is a phototransistor that is switched ON and OFF via light. When the control circuit 85 switches the switching device 84 ON, the shorting circuit 88 short circuits the rectifying circuit 53 side of the capacitor 86 to connect the capacitor 86 in parallel with the receiving coil 51. When the control circuit 85 switches the switching device 84 OFF, the shorting circuit 88 is not short circuited but rather is open circuited. This connects the capacitor 86 in series with the rectifying circuit 53 to output receiving coil 51 AC power to the rectifying circuit 53 through the capacitor 86.

As shown in FIGS. 1-7, the charging pad 10 is provided with a transmitting coil 11 connected to the AC power source 12 to induce electromotive force (EMF) in the receiving coil 51, a case 20 housing the transmitting coil 11 and having a top plate 21 to place a device housing a battery 50, a moving mechanism 13 housed in the case 20 to move the transmitting coil 11 along the inside surface of the top plate 21, and a position detection controller 14 that detects the position of a device housing a battery 50 placed on the top plate 21 and controls the moving mechanism 13 to move the transmitting coil 11 close to the receiving coil 51 of the device housing a battery 50. The transmitting coil 11, AC power source 12, moving mechanism 13, and position detection controller 14 are housed inside the case 20.

The charging pad 10 charges the battery 52 inside a device housing a battery 50 in the following manner.
(1) When a device housing a battery 50 is placed on the top plate 21 of the case 20, the position detection controller 14 detects its position.
(2) The position detection controller 14, which has detected the position of the device housing a battery 50, controls the moving mechanism 13 to move the transmitting coil 11 along the inside of the top plate 21 and position it in close proximity to the receiving coil 51 of the device housing a battery 50.
(3) The transmitting coil 11, which has been moved close to the receiving coil 51, is magnetically coupled to the receiving coil 51 and transmits AC power to the receiving coil 51.
(4) The device housing a battery 50 converts the receiving coil 51 AC power to DC and charges the internal battery 52 with that DC power.

The charging pad 10, which charges the battery 52 in a device housing a battery 50 by the procedure described above, houses the transmitting coil 11 connected to the AC power source 12 inside the case 20. The transmitting coil 11 is disposed beneath the top plate 21 of the case 20 in a manner that allows it to move along the inside of the top plate 21. The efficiency of power transmission from the transmitting coil 11 to the receiving coil 51 is improved by narrowing the gap between the transmitting coil 11 and the receiving coil 51. With the transmitting coil 11 moved into close proximity with the receiving coil 51, the gap between the transmitting coil 11 and the receiving coil 51 is preferably less than or equal to 7 mm. Therefore, the transmitting coil 11 is disposed under the top plate 21 and positioned as close as possible to the top plate 21. Since the transmitting coil 11 is moved close to the receiving coil 51 of a device housing a battery 50 placed on the top plate 21, the transmitting coil 11 is disposed in a manner that allows it to move along the inside surface of the top plate 21.

The case 20 that houses the transmitting coil 11 is provided with a planar top plate 21 where a device housing a battery 50 can be placed. The charging pad 10 of FIGS. 1 and 2 has an overall planar top plate 21 that is disposed horizontally. The top plate 21 is made large enough to allow placement of devices housing a battery 50 having different sizes and shapes. For example, the top plate 21 can have a rectangular shape with a side having a length of 5 cm to 30 cm. However, the top plate 21 can also have a circular shape with a diameter of 5 cm to 30 cm. The charging pad 10 of FIGS. 1 and 2 has a large top plate 21 that allows simultaneous placement of a plurality of devices housing a battery 50. Here, a plurality of devices housing a battery 50 is placed on the top plate 21 at the same time to allow sequential charging of their internal batteries 52. Further, the top plate can also be provided with side-walls or other barriers around its perimeter, and devices housing a battery can be placed inside the side-walls to charge the internal batteries.

The top plate 21 of the case 20 is translucent to allow visual confirmation of the internal movement of the transmitting coil 11 from the outside. Since the user can visually confirm that the transmitting coil 11 is in close proximity to the device housing a battery 50, the user can dependably confirm charging of the device housing a battery 50. As a result, the user can operate the charging pad 10 with confidence. Further, light emitting diodes (LEDs) 19 can be provided to illuminate the moving transmitting coil 11 and its vicinity. This can accentuate transmitting coil 11 movement and create an aesthetically pleasing design. In addition, the LEDs 19 can be configured to shine through the top plate 21 to illuminate the device housing a battery 50. The charging pad 10 shown in FIGS. 2 and 3 has four LEDs 19 disposed at equal intervals around the transmitting coil 11. As shown in FIG. 7, these LEDs 19 are energized by power supplied from a DC power supply 18 housed in the charging pad 10. However, LEDs can also be disposed at the center region of the transmitting coil. In addition, the number of LEDs used to show the transmitting coil position can be three or less, or five or more. With this charging pad 10, the device housing a battery 50 can be illuminated during charging, or visual effects such as the color or blinking pattern of the LEDs 19 can be changed depending on the state of charge. This type of charging pad 10 can clearly indicate to the user the state of charge of a device housing a battery 50.

The transmitting coil 11 is wound in a plane parallel to the top plate 21, and radiates AC magnetic flux above the top plate 21. This transmitting coil 11 emits AC magnetic flux perpendicular to, and beyond the top plate 21. The transmitting coil 11 is supplied with AC power from the AC power source 12 and radiates AC magnetic flux above the top plate 21. Wire can be wound around a magnetic material core 15 to make a transmitting coil 11 with high inductance. The core 15 is magnetic material with a high magnetic permeability such as ferrite and has the shape of an open end container. The core 15 has a solid circular cylinder 15A at the center of the spiral wound transmitting coil 11 and a circular cylindrical enclosure 15B around the outside that are joined by a bottom section (refer to FIGS. 4 and 5). A transmitting coil 11 with a core 15 can focus magnetic flux in a specific region to efficiently transmit power to the receiving coil 51. However, a magnetic material core is not always required in the transmitting coil, and a coil with no core can also be used. Since a coil with no core is light, the moving mechanism that moves the transmitting coil inside the top plate can be simplified. The transmitting coil 11 is made with essentially the same outside diameter as the receiving coil 51 to efficiently transmit power to the receiving coil 51.

The AC power source 12 supplies high frequency power, for example 20 kHz to several MHz, to the transmitting coil 11. The AC power source 12 is connected to the transmitting coil 11 via flexible lead wires 16. This is because the transmitting coil 11 has to be moved close to the devices housing a battery 50 that are placed on the top plate 21. Although not illustrated, the AC power source 12 is provided with a self-excited oscillator circuit, and a power amplifier to amplify the AC power output from the self-excited oscillator circuit. The self-excited oscillator circuit uses the transmitting coil 11 as an oscillator circuit inductor. Consequently, the oscillator frequency changes with the inductance of the transmitting coil 11. The inductance of the transmitting coil 11 changes with the relative position of the transmitting coil 11 with respect to the receiving coil 51. This is because the mutual inductance of the transmitting coil 11 and the receiving coil 51 changes with the relative position of the transmitting coil 11 with respect to the receiving coil 51. Therefore, the frequency of the self-excited oscillator circuit, which uses the transmitting coil 11 as an oscillator circuit inductor, changes as the transmitting coil 11 approaches the receiving coil 51. As a result, the self-excited oscillator circuit can detect the relative position of the transmitting coil 11 with respect to the receiving coil 51 from the change in oscillating frequency, and can be used with the dual purpose as a position detection controller 14.

The transmitting coil 11 is moved in close proximity to the receiving coil 51 by the moving mechanism 13. The moving mechanism 13 of FIGS. 2-5 moves the transmitting coil 11 along the inside of the top plate 21 in the X-axis and Y-axis directions to position it close to the receiving coil 51. The moving mechanism 13 of the figures rotates threaded rods 23 via servo motors 22 controlled by the position detection controller 14 to move nut blocks 24 that are threaded onto the threaded rods 23. The nut blocks 24 are moved to move the transmitting coil 11 close to the receiving coil 51. The servo motors 22 are provided with an X-axis servo motor 22A to move the transmitting coil 11 in the X-axis direction, and a Y-axis servo motor 22B to move the transmitting coil 11 in the Y-axis direction. The threaded rods 23 are provided with a pair of X-axis threaded rods 23A to move the transmitting coil 11 in the X-axis direction, and a Y-axis threaded rod 23B to move the transmitting coil 11 in the Y-axis direction. The pair of X-axis threaded rods 23A are disposed parallel to each other, and are connected via belts 25 to rotate together when driven by the X-axis servo motor 22A. The threaded nut blocks 24 are provided with a pair of X-axis nut blocks 24A that are threaded onto each X-axis threaded rod 23A, and a Y-axis nut block 24B that is threaded onto the Y-axis threaded rod 23B. Both ends of the Y-axis threaded rod 23B are connected to the X-axis nut blocks 24A in a manner allowing rotation. The transmitting coil 11 is mounted on the Y-axis nut block 24B.

Further, the moving mechanism 13 of the figures has a guide rod 26 disposed parallel to the Y-axis threaded rod 23B to move the transmitting coil 11 in the Y-axis direction while retaining it in a horizontal orientation. The guide rod 26 is connected at both ends to the X-axis nut blocks 24A and moves together with the pair of X-axis nut blocks 24A. The guide rod 26 passes through a guide block 27 attached to the transmitting coil 11 to allow transmitting coil 11 movement along the guide rod 26 in the Y-axis direction. Specifically, the transmitting coil 11 is moved with horizontal orientation in the Y-axis direction via the Y-axis nut block 24B and guide block 27 that move along the parallel disposed Y-axis threaded rod 23B and guide rod 26.

When the X-axis servo motor 22A rotates the X-axis threaded rods 23A of this moving mechanism 13, the pair of X-axis nut blocks 24A move along the X-axis threaded rods 23A to move the Y-axis threaded rod 23B and the guide rod 26 in the X-axis direction. When the Y-axis servo motor 22B rotates the Y-axis threaded rod 23B, the Y-axis nut block 24B moves along the Y-axis threaded rod 23B to move the transmitting coil 11 in the Y-axis direction. Here, the guide block 27 attached to the transmitting coil 11 moves along the guide rod 26 to maintain the transmitting coil 11 in a horizontal orientation during movement in the Y-axis direction. Consequently, rotation of the X-axis servo motor 22A and Y-axis servo motor 22B can be controlled by the position detection controller 14 to move the transmitting coil 11 in the X-axis and Y-axis directions. However, the charging pad of the present invention is not limited to a moving mechanism with the configuration described above. This is because any configuration of moving mechanism can be used that can move the transmitting coil in the X-axis and Y-axis directions.

Further, the charging pad of the present invention is not limited to a moving mechanism that moves the transmitting coil in the X-axis and Y-axis directions. This is because the charging pad of the present invention can be provided with a straight-line guide wall on the top plate, the devices housing a battery can be aligned along the guide wall, and the transmitting coil can be moved in a straight-line along the guide wall. Although not illustrated, this charging pad can move the transmitting coil in a straight-line along the guide wall with a moving mechanism that moves the transmitting coil in one direction such as in the X-axis direction only.

The position detection controller 14 detects the position of a device housing a battery 50 that is placed on the top plate 21. The position detection controller 14 of FIGS. 2-5 detects the position of the receiving coil 51 housed in the device housing a battery 50, and moves the transmitting coil 11 close to the receiving coil 51. Further, the position detection controller 14 is provided with a first position detection controller 14A that roughly determines the position of the receiving coil 51, and a second position detection controller 14B that determines the position of the receiving coil 51 with precision. In this position detection controller 14, the first position detection controller 14A roughly determines the position of the receiving coil 51 and controls the moving mechanism 13 to move the transmitting coil 11 close to the receiving coil 51. Subsequently, the second position detection controller 14B detects the receiving coil 51 position with precision while controlling the moving mechanism 13 to move the transmitting coil 11 more accurately to the position of the receiving coil 51. This charging pad 10 can quickly move the transmitting coil 11 close to the receiving coil 51 with precision.

As shown in FIG. 6, the first position detection controller 14A is provided with a plurality of position detection coils 30 fixed to the inside of the top plate 21, a detection signal generating circuit 31 that supplies position detection signals to the position detection coils 30, a receiving circuit 32 that receives echo signals from the position detection coils 30 resulting from excitation of the receiving coil 51 by position detection signals supplied to the position detection coils 30 from the detection signal generating circuit 31, and a discrimination circuit 33 that determines receiving coil 51 position from the echo signals received by the receiving circuit 32.

The position detection coils 30 are made up of a plurality of coils in rows and columns. The plurality of position detection coils 30 is fixed with specified intervals between each coil on the inside surface of the top plate 21. The position detection coils 30 are provided with a plurality of X-axis detection coils 30A that detect receiving coil 51 position on the X-axis, and a plurality of Y-axis detection coils 30B that detect receiving coil 51 position on the Y-axis. Each X-axis detection coil 30A is a long narrow loop extending in the Y-axis direction, and the X-axis detection coils 30A are fixed to the inside of the top plate 21 at specified intervals. The interval (d) between adjacent X-axis detection coils 30A is smaller than the outside diameter (D) of the receiving coil 51, and preferably the interval (d) between X-axis detection coils 30A is from 1 times to ¼ times the receiving coil 51 outside diameter (D). The position of the receiving coil 51 on the X-axis can be detected more accurately by reducing the interval (d) between X-axis detection coils 30A. Each Y-axis detection coil 30B is a long narrow loop extending in the X-axis direction, and the Y-axis detection coils 30B are also fixed to the inside of the top plate 21 at specified intervals. In the same manner as the X-axis detection coils 30A, the interval (d) between adjacent Y-axis detection coils 30B is smaller than the outside diameter (D) of the receiving coil 51, and preferably the interval (d) between Y-axis detection coils 30B is from 1 times to ¼ times the receiving coil 51 outside diameter (D). The position of the receiving coil 51 on the Y-axis can also be detected more accurately by reducing the interval (d) between Y-axis detection coils 30B.

The detection signal generating circuit 31 issues pulse signals, which are the position detection signals, with a specified timing. A position detection coil 30, which has input a position detection signal, excites a nearby receiving coil 51 via the position detection signal. The receiving coil 51, which has been excited by a position detection signal, outputs an echo signal, which is generated by the energy of the induced current flow, and that echo signal is detected by the position detection coil 30. Specifically, as shown in FIG. 10, following a given delay time after a position detection signal has been input, the receiving coil 51 generates an echo signal, and that echo signal is induced in the position detection coil 30 near the receiving coil 51. The echo signal induced in the position detection coil 30 is sent from the receiving circuit 32 to the discrimination circuit 33. The discrimination circuit 33 uses the echo signal input from the receiving circuit 32 to determine if the receiving coil 51 is close to the position detection coil 30. When echo signals are induced in a plurality of position detection coils 30, the discrimination circuit 33 determines that the position detection coil 30 with the largest amplitude echo signal is closest to the receiving coil 51.

The position detection controller 14 shown in FIG. 6 connects each position detection coil 30 to the receiving circuit 32 via a switching matrix 34. Since this position detection controller 14 can connect a plurality of position detection coils 30 by sequential switching, echo signals from a plurality of position detection coils 30 can be detected with one receiving circuit 32. However, a receiving circuit can also be connected to each position detection coil to detect the echo signals.

In the position detection controller 14 of FIG. 6, the discrimination circuit 33 controls the switching matrix 34 to sequentially switch each of the position detection coils 30 for connection to the receiving circuit 32. Since the detection signal generating circuit 31 is connected outside the switching matrix 34, it outputs position detection signals to each position detection coil 30. The amplitude of the position detection signals output from the detection signal generating circuit 31 to the position detection coils 30 is extremely large compared to the echo signals from the receiving coil 51. The receiving circuit 32 has a diode connected to its input-side that forms a voltage limiting circuit 35. Position detection signals input to the receiving circuit 32 from the detection signal generating circuit 31 are voltage limited by the limiting circuit 35. Low amplitude echo signals are input to the receiving circuit 32 without voltage limiting. The receiving circuit 32 amplifies and outputs both position detection signals and the echo signals. An echo signal output from the receiving circuit 32 is a signal that is delayed from the position detection signal by a given delay time such as several μsec to several hundred μsec. Since the echo signal delay time from the position detection signal is constant, a signal received after the constant delay time is assumed to be an echo signal, and the proximity of a position detection coil 30 to the receiving coil 51 is determined from the amplitude of that echo signal.

The receiving circuit 32 is an amplifier that amplifies echo signals input from the position detection coils 30. The receiving circuit 32 outputs each position detection signal and echo signal. The discrimination circuit 33 determines if the receiving coil 51 is placed next to a position detection coil 30 from the position detection signal and echo signal input from the receiving circuit 32. The discrimination circuit 33 is provided with an analog-to-digital (ND) converter 36 to convert the signals input from the receiving circuit 32 to digital signals. Digital signals output from the ND converter 36 are processed to detect the echo signals. The discrimination circuit 33 detects a signal that is delayed from the position detection signal by a given delay time as an echo signal, and determines if the receiving coil 51 is close to the position detection coil 30 from the amplitude of the echo signal.

The discrimination circuit 33 controls the switching matrix 34 to sequentially connect each of the plurality of X-axis detection coils 30A to the receiving circuit 32 to detect the position of the receiving coil 51 along the X-axis. For each X-axis detection coil 30A connected to the receiving circuit 32, the discrimination circuit 33 outputs a position detection signal to that X-axis detection coil 30A and determines if the receiving coil 51 is close to that X-axis detection coil 30A by detection or lack of detection of an echo signal after a given delay time from the position detection signal. The discrimination circuit 33 connects each one of the X-axis detection coils 30A to the receiving circuit 32, and determines if a receiving coil 51 is close to any of the X-axis detection coils 30A. If a receiving coil 51 is close to one of the X-axis detection coils 30A, an echo signal will be detected when that X-axis detection coil 30A is connected to the receiving circuit 32. Consequently, the discrimination circuit 33 can determine the position of the receiving coil 51 along the X-axis from the X-axis detection coil 30 that outputs an echo signal. When the receiving coil 51 straddles a plurality of X-axis detection coils 30, echo signals can be detected by a plurality of X-axis detection coils 30A. In that case, the discrimination circuit 33 determines that the receiving coil 51 is closest to the X-axis detection coil 30A that detects the strongest echo signal, which is the echo signal with the largest amplitude. The discrimination circuit 33 controls the Y-axis detection coils 30B in the same manner to determine the position of the receiving coil 51 along the Y-axis.

The discrimination circuit 33 controls the moving mechanism 13 according to the detected X-axis and Y-axis position to move the transmitting coil 11 close to the receiving coil 51. The discrimination circuit 33 controls the X-axis servo motor 22A to move the transmitting coil 11 to the receiving coil 51 position on the X-axis. The discrimination circuit 33 also controls the Y-axis servo motor 22B to move the transmitting coil 11 to the receiving coil 51 position on the Y-axis.

The first position detection controller 14A moves the transmitting coil 11 to a position close to the receiving coil 51 in the manner described above. The charging pad of the present invention can move the transmitting coil 11 close to the receiving coil 51 with the first position detection controller 14A, and subsequently transmit power from the transmitting coil 11 to the receiving coil 51 to charge the battery 52. However, the charging pad can further refine the position of the transmitting coil 11 and move it still closer to the receiving coil 51 to subsequently transmit power and charge the battery 52. The transmitting coil 11 is more precisely positioned close to the receiving coil 51 by the second position detection controller 14B.

Figure 11:
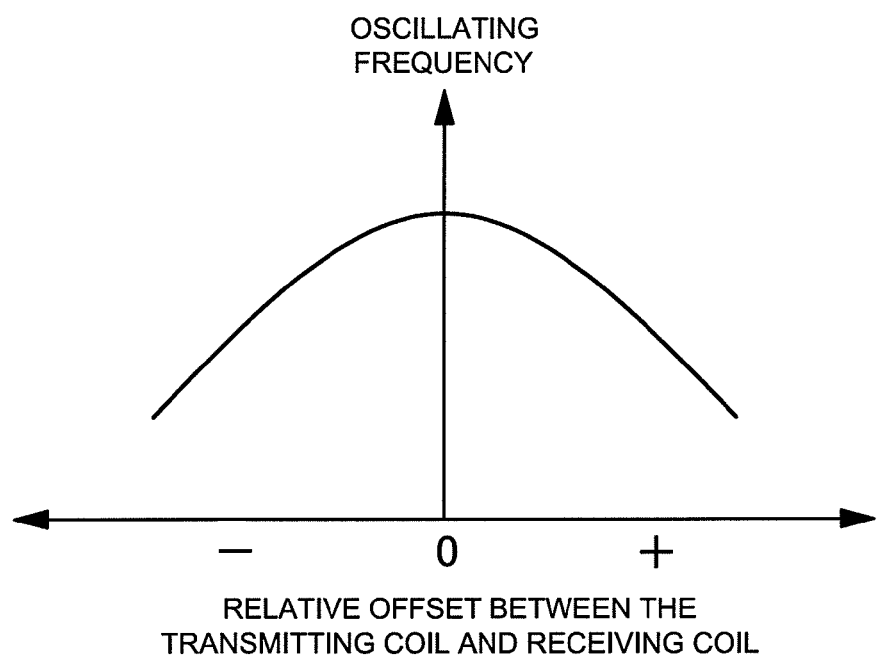
FIG. 11 is a graph showing oscillation frequency as a function of the relative positional offset of the transmitting coil and the receiving coil.

The second position detection controller 14B has an AC power source 12 that is a self-excited oscillator circuit, and the second position detection controller 14B controls the moving mechanism 13 to move the transmitting coil 11 to a position accurately determined by the oscillating frequency of the self-excited oscillator circuit. The second position detection controller 14B controls the moving mechanism 13 X-axis servo motor 22A and Y-axis servo motor 22B to move the transmitting coil 11 along the X and Y-axes while detecting the AC power source 12 oscillating frequency. Self-excited oscillator circuit oscillating frequency characteristics are shown in FIG. 11. This figure shows the change in oscillating frequency as a function of the relative offset (displacement) between the transmitting coil 11 and the receiving coil 51. As shown in this figure, the oscillating frequency of the self-excited oscillator circuit has a maximum where the transmitting coil 11 and receiving coil 51 are closest, and the oscillating frequency drops off as the two coils become separated. The second position detection controller 14B controls the moving mechanism 13 X-axis servo motor 22A to move the transmitting coil 11 along the X-axis, and stops the transmitting coil 11 where the oscillating frequency reaches a maximum. Similarly, the second position detection controller 14B controls the Y-axis servo motor 22B in the same manner to move the transmitting coil 11 along the Y-axis, and stops the transmitting coil 11 where the oscillating frequency reaches a maximum. The second position detection controller 14B can move the transmitting coil 11 in the manner described above to a position that is closest to the receiving coil 51.

In the charging pad described above, the first position detection controller 14A roughly detects the position of the receiving coil 51. Subsequently, the second position detection controller 14B finely adjusts the transmitting coil 11 position to move it still closer to the receiving coil 51. However, the position detection controller 44 shown in FIG. 12 and described below can move the transmitting coil 11 close to the receiving coil 51 without fine adjustments.

Figure 12:
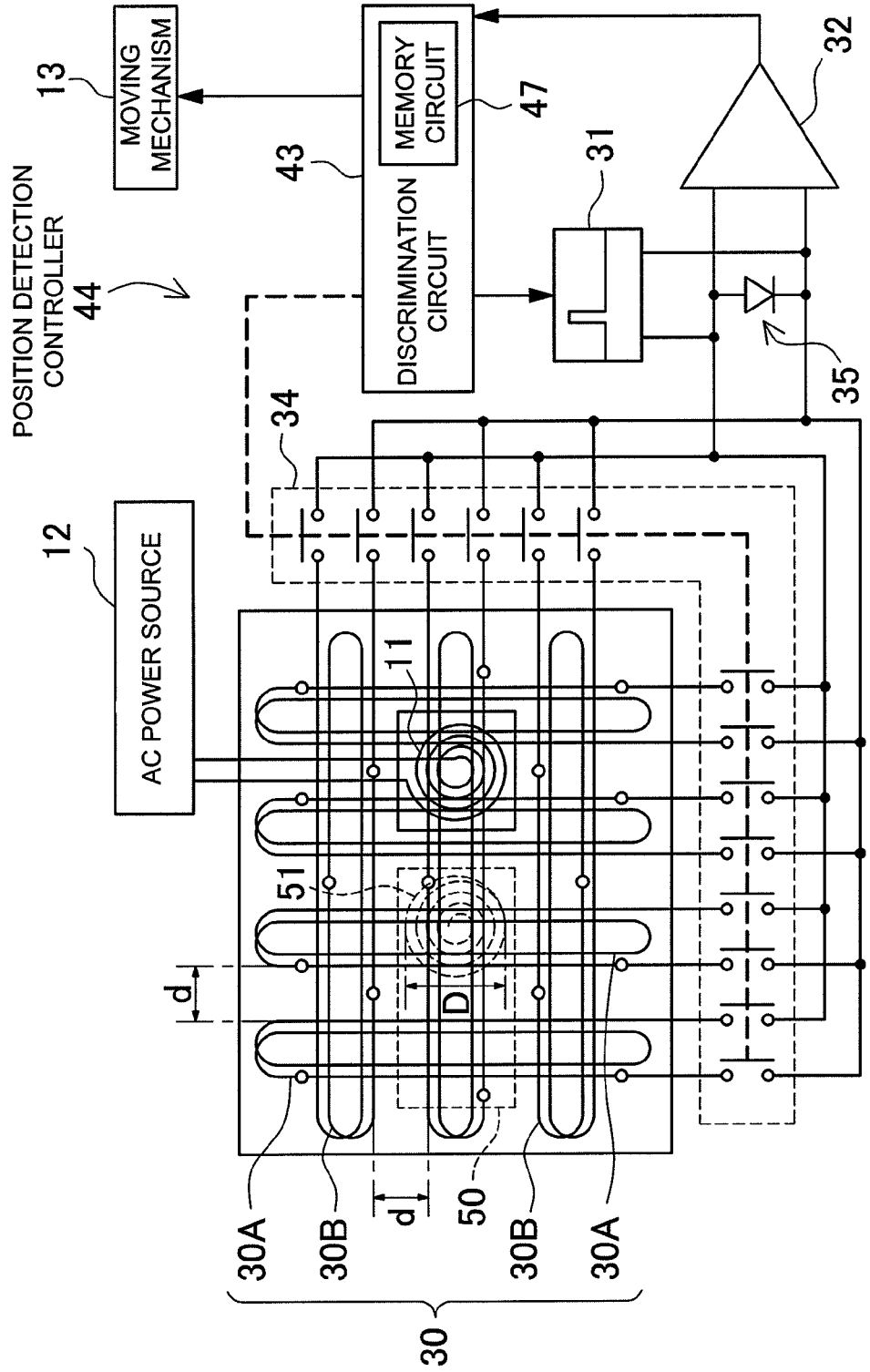
FIG. 12 is a circuit diagram showing the position detection controller of the charging pad of another embodiment of the present invention.

As shown in FIG. 12, the position detection controller 44 is provided with a plurality of position detection coils 30 fixed to the inside of the top plate, a detection signal generating circuit 31 that supplies position detection signals to the position detection coils 30, a receiving circuit 32 that receives echo signals from the position detection coils 30 resulting from excitation of the receiving coil 51 by pulse signals supplied to the position detection coils 30 from the detection signal generating circuit 31, and a discrimination circuit 43 that determines receiving coil 51 position from the echo signals received by the receiving circuit 32. In this position detection controller 44, the discrimination circuit 43 is provided with a memory circuit 47 to store the amplitude of echo signals induced in each position detection coil 30 corresponding to receiving coil 51 position. Specifically, this is the amplitude of echo signals resulting from receiving coil 51 excitation that are induced in each position detection coil 30 after a given delay time, as shown in FIG. 10. The position detection controller 44 detects the amplitude of the echo signal induced in each position detection coil 30, and compares the detected echo signal amplitude with the echo signal amplitudes stored in the memory circuit 47 to determine the receiving coil 51 position.

Figure 13:
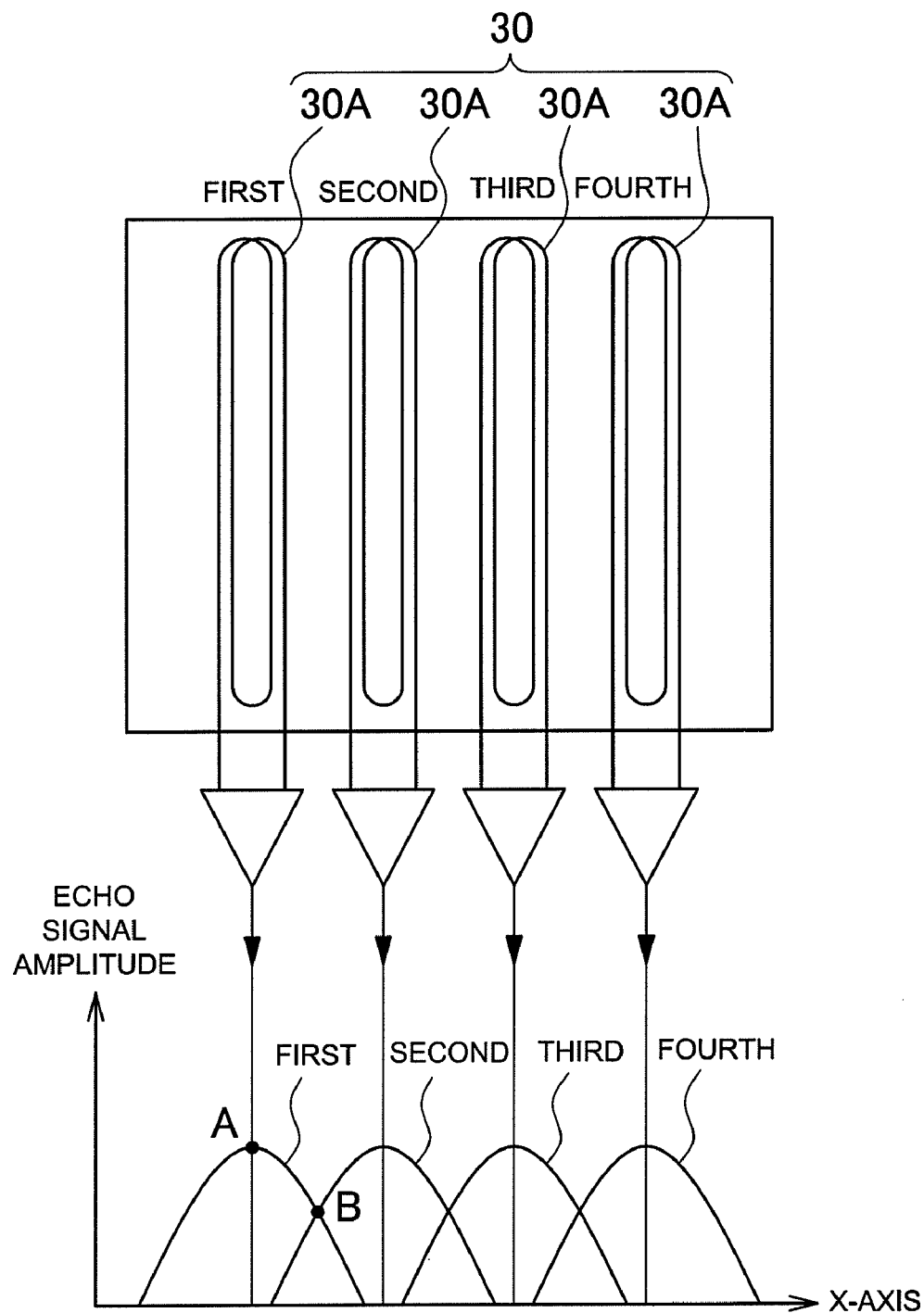
FIG. 13 is a schematic and graph showing signal levels (amplitudes) of echo signals induced in the position detection coils of the position detection controller shown in FIG. 12.

The position detection controller 44 determines receiving coil 51 position from the amplitude of the echo signal induced in each position detection coil 30 in the following manner. The position detection coils 30 shown in FIG. 12 are provided with a plurality of X-axis detection coils 30A that detect receiving coil 51 position on the X-axis, and a plurality of Y-axis detection coils 30B that detect receiving coil 51 position on the Y-axis. The position detection coils 30 are fixed to the inside of the top plate 21 at specified intervals. Each X-axis detection coil 30A is a long narrow loop extending in the Y-axis direction, and each Y-axis detection coil 30B is a long narrow loop extending in the X-axis direction. FIG. 13 shows the amplitude of the echo signal induced in each X-axis detection coil 30A as the receiving coil 51 is moved along the X-axis. The horizontal axis of FIG. 13 shows the position of the receiving coil 51 on the X-axis, and the vertical axis shows the amplitude of the echo signal induced in each X-axis detection coil 30A. This position detection controller 44 can determine the position of the receiving coil 51 on the X-axis by detecting the amplitude of the echo signal induced in each X-axis detection coil 30A. As shown in FIG. 13, the amplitude of the echo signal induced in each X-axis detection coil 30A changes as the receiving coil 51 position along the X-axis changes. For example, when the center of the receiving coil 51 is at the center of the first X-axis detection coil 30A, the amplitude of the echo signal induced in the first X-axis detection coil 30A is a maximum as shown by point A in FIG. 13. When the receiving coil 51 is halfway between the first and second X-axis detection coils 30A, the amplitude of the echo signals induced in the first and second X-axis detection coils 30A is equal as shown by point B in FIG. 13. Specifically, the amplitude of an echo signal detected in an X-axis detection coil 30A is maximum (strongest signal) when the receiving coil 51 is closest to that detection coil, and the amplitude of the echo signal decreases as the receiving coil 51 is separated from that detection coil. Therefore, the X-axis detection coil 30A closest to the receiving coil 51 can be determined by which X-axis detection coil 30A has the largest amplitude echo signal. When echo signals are induced in two X-axis detection coils 30A, the direction of receiving coil 51 offset from the X-axis detection coil 30A with the largest echo signal amplitude can be determined from the direction, relative to the X-axis detection coil 30A with the largest echo signal, of the other X-axis detection coil 30A that detects an echo signal. Further, the relative position of the receiving coil 51 between two X-axis detection coils 30A can be determined from the ratio of the amplitudes of the echo signals induced in the two X-axis detection coils 30A. For example, if the ratio between echo signal amplitudes detected in two X-axis detection coils 30A is one, the receiving coil 51 position can be determined to be halfway between the two X-axis detection coils 30A.

The discrimination circuit 43 stores in the memory circuit 47 the echo signal amplitude induced in each X-axis detection coil 30A corresponding to receiving coil 51 position on the X-axis. When a receiving coil 51 is placed on the charging pad 10, an echo signal is detected in one of the X-axis detection coils 30A. Therefore, the discrimination circuit 43 can determine from the echo signal induced in the X-axis detection coil 30A that a receiving coil 51 has been placed on the charging pad 10; namely, that a device housing a battery 50 has been placed on the charging pad 10. Further, by comparing the amplitude of the echo signal induced in each X-axis detection coil 30A with the amplitudes stored in the memory circuit 47, the position of the receiving coil 51 on the X-axis can be determined. The discrimination circuit can also store a function in the memory circuit that specifies receiving coil X-axis position corresponding to the ratio of the amplitudes of echo signals induced in adjacent X-axis detection coils. Receiving coil position can be determined from the function stored in memory. This function can be determined by moving the receiving coil between two X-axis detection coils and measuring the ratio of the echo signal amplitudes in the two detection coils. Here, the discrimination circuit 43 detects the ratio of the amplitudes of echo signals induced in two X-axis detection coils 30A. Based on the function stored in memory, the X-axis position of the receiving coil 51 between the two X-axis detection coils 30A can be computed from the detected echo signal amplitude ratio.

Discrimination circuit 43 detection of receiving coil 51 X-axis position from echo signals induced in the X-axis detection coils 30A is described above. Receiving coil 51 position on the Y-axis can be detected in a similar manner from echo signals induced in the Y-axis detection coils 30B.

When the discrimination circuit 43 has detected the receiving coil 51 position on the X and Y-axes, the position detection controller 44 moves the transmitting coil 11 to the receiving coil 51 position based on a position signal issued from the discrimination circuit 43.

When an echo signal is detected having a waveform as described previously, the charging pad discrimination circuit 43 can recognize and distinguish that a receiving coil 51 of a device housing a battery 50 has been placed on the charging pad. When a waveform is detected and determined to be different from an echo signal, an object other than the receiving coil 51 of a device housing a battery 50 (for example, a metal foreign object) is assumed to be on the charging pad and the supply of power can be terminated. In addition, when no echo signal waveform is detected, it is assumed that no device housing a battery 50 receiving coil 51 has been placed on the charging pad and power is not supplied.

The charging pad 10 position detection controller 14, 44 controls the moving mechanism 13 to move the transmitting coil 11 close to the receiving coil 51. In this state, AC power is supplied to the transmitting coil 11 from the AC power source 12. AC power from the transmitting coil 11 is transmitted to the receiving coil 51 and used to charge the battery 52. The position detection controller 14 shown in FIG. 7 houses a detection circuit 17 that detects battery information sent from the device housing a battery 50. The detection circuit 17 controls battery 52 charging voltage and current to charge the battery 52 based on the battery information sent from the device housing a battery 50. Full-charge of the battery 52 is transmitted as battery data from the device housing a battery 50. Consequently, the detection circuit 17 detects full-charge of the battery 52 from the battery information sent from the device housing a battery 50 and stops the supply of AC power to the transmitting coil 11 to terminate charging.

A charging pad 10, which has a top plate 21 where a plurality of devices housing a battery 50 can be placed, sequentially charges the battery 52 in each device housing a battery 50 to full-charge. As shown in FIG. 1, the charging pad 10 first detects the position of the receiving coil 51 in any one of the devices housing a battery 50 (the first device housing a battery 50A). The transmitting coil 11 is moved close to the receiving coil 51, and the battery 52 in the first device housing a battery 50A is charged to full-charge. When the battery 52 in the first device housing a battery 50A reaches full-charge and the detection circuit 17 receives a full-charge signal from that device housing a battery 50A, the position detection controller 14 detects the position of another receiving coil 51 in a second device housing a battery 50B and controls the moving mechanism 13 to move the transmitting coil 11 to the receiving coil 51 of the second device housing a battery 50B. In this state, power is transmitted to charge the battery 52 in the second device housing a battery 50B and that battery 52 is charged to full-charge. When the battery 52 in the second device housing a battery 50B reaches full-charge and the detection circuit 17 receives a full-charge signal transmitted from the second device housing a battery 50B, the position detection controller 14 detects the position of the receiving coil 51 in a third device housing a battery 50C and controls the moving mechanism 13 to move the transmitting coil 11 to the receiving coil 51 of the third device housing a battery 50C. In this state, power is transmitted to charge the battery 52 in the third device housing a battery 50C and that battery 52 is charged to full-charge. In this manner, when a plurality of devices housing a battery 50 are placed on the top plate 21, the charging pad 10 sequentially switches from one device housing a battery 50 to another to fully charge all the internal batteries 52. This charging pad 10 stores in memory the location of devices housing a battery 50 that have been fully charged, and does not charge the batteries 52 in devices that have been fully charged. When full-charge of the batteries 52 in all the devices housing a battery 50 placed on the top plate 21 has been detected, the charging pad 10 suspends operation of the AC power source 12 and stops battery 52 charging. In the embodiments described above and below, charging of the battery 52 in a device housing a battery 50 is stopped when full-charge is reached. However, it is also possible to treat a specific battery capacity as full-charge and stop charging when that specific battery capacity is reached.

As described above, a charging pad 10 that fully charges batteries 52 in a plurality of devices housing a battery 50 can move the transmitting coil 11 to the receiving coil 51 of the next device housing a battery 50 to fully charge the battery 52 in the next device when the battery 52 in the previous device has been fully charged. This can sequentially charge the batteries 52 in a plurality of devices housing a battery 50 to full-charge. Further, a charging pad 10 that charges a plurality of devices housing a battery 50 can move the transmitting coil 11 to the receiving coil 51 of another device housing a battery 50 when the battery 52 in the device housing a battery 50 presently being charged has not reached full-charge. By repeating this procedure, namely by switching one after another the device housing a battery 50 that is being charged, the battery 52 in each device housing a battery 50 can be fully charged. For example, the charging pad 10 detection circuit 17 can detect battery data such as battery voltage, remaining capacity, and battery temperature transmitted from the device housing a battery 50 being charged, and switch the device housing a battery 50 based on the detected data. The charging pad 10 can also move the transmitting coil to the receiving coil of another device housing a battery to switch the device housing a battery being charged when a specified time has elapsed. A charging pad that switches the device housing a battery being charged based on battery voltage switches the device when battery voltage reaches a predetermined voltage or when the rate of rise in voltage of the battery being charged becomes equal to a set value. The charging pad can detect remaining battery capacity to switch the device housing a battery being charged. Here, the device housing a battery being charged is switched when the remaining capacity of the battery being charged reaches a set capacity or when the change in remaining capacity becomes equal to a set value. The charging pad can detect battery temperature to switch the device housing a battery being charged. Here, the device housing a battery being charged is switched when the temperature of the battery being charged reaches a set temperature. A charging pad that switches the device housing a battery being charged when a set time has elapsed houses a timer, and the device housing a battery being charged is switched when the timer times out. In addition, the charging pad can also switch the device housing a battery being charged based on all the battery data including voltage, remaining capacity, temperature, and charging time.

The charging pad 10 described above charges the battery 52 in the next device housing a battery 50 before the previous battery 52 has reached full-charge. Since the charging pad 10 repeats this procedure to charge the devices housing a battery 50, the power transmitted from the transmitting coil 11 to the receiving coil 51 can be increased to fully charge a plurality of devices housing a battery 50 in a short time period. This is because battery 52 charging current can be increased when charging a single battery 52 for only a short time period. The power transmitted by a charging pad, which transmits power in a non-contact manner from a transmitting coil 11 to a receiving coil 51 in close proximity, is limited by unavoidable receiving coil and battery heat generation caused by magnetic flux leakage. However, by switching the device housing a battery 50 during charging, the transmitted power can be increased while preventing receiving coil 51 and battery 52 heat generation. Specifically, battery 52 charging current can be increased to rapidly charge the battery 52 to full-charge. This is because the battery 52 and receiving coil 51 are cooled during the periods when charging is not being performed. Consequently, a charging pad 10, which switches the device housing a battery 50 being charged prior to reaching full-charge, has the characteristic that the batteries 52 can be rapidly charged to full-charge while limiting receiving coil 51 and battery 52 heating.

As shown for example in FIG. 1, where three devices housing a battery 50 are placed on the top plate 21, the battery 52 in each device housing a battery 50 can be charged to full-charge in the following manner.

(1) First, the position of the receiving coil 51 in any one of the devices housing a battery 50 is detected, and the transmitting coil 11 is moved close to the receiving coil 51 to charge the battery 52 in the first device housing a battery 50A.

(2) The position detection controller 14 suspends charging of the battery 52 in the first device housing a battery 50A based on data such as battery voltage, remaining battery capacity, and battery temperature transmitted from the first device housing a battery 50A. The position of the receiving coil 51 in the second device housing a battery 50B, which is placed in a different location from the first device housing a battery 50A, is detected. The moving mechanism 13 is controlled to move the transmitting coil 11 close to the receiving coil 51 in the second device housing a battery 50B. In this state, power is transmitted to the second device housing a battery 50B to charge that battery 52.

(3) The position detection controller 14 suspends charging of the battery 52 in the second device housing a battery 50B based on battery data transmitted from the second device housing a battery 50B. The position of the receiving coil 51 in the third device housing a battery 50C, which is placed in still a different location, is detected. The moving mechanism 13 is controlled to move the transmitting coil 11 close to the receiving coil 51 in the third device housing a battery 50B to charge the battery 52 in the third device housing a battery 50B.

(4) Next, The position detection controller 14 suspends charging of the battery 52 in the third device housing a battery 50C based on battery data transmitted from the third device housing a battery 50C, and the transmitting coil 11 is moved to the position of the receiving coil 51 in the first device housing a battery 50A to charge the battery 52 in that device.

(5) In the manner described above, the first device housing a battery 50A, the second device housing a battery 50B, and the third device housing a battery 50C are repeatedly charged to charge their internal batteries 52 to full-charge. During the process of battery 52 charging while switching the devices housing a battery 50, if any one of the batteries 52 becomes fully charged, charging is terminated for that device housing a battery 50 and the batteries 52 of the next devices housing a battery 50 are sequentially charged to full-charge. When full-charge is detected for the batteries 52 in all the devices housing a battery 50 placed on the top plate 21, the charging pad 10 stops operation of the AC power source 12 and terminates battery 52 charging.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The present application is based on Application No. 2009-142793 filed in Japan on Jun. 15, 2009, the content of which is incorporated herein by reference.

What is claimed is:

1. A combination comprising:
a battery housing device housing an internal battery, the battery housing device having a receiving coil that supplies charging power to the internal battery; and
a charging pad having a transmitting coil that magnetically couples with the receiving coil of the battery housing device and supplies charging power,
wherein the battery housing device further comprises a modulator circuit that modulates the impedance of the receiving coil with internal battery information,
wherein the charging pad further comprises a detection circuit that detects battery information via the transmitting coil by detecting receiving coil impedance changes made by the modulator circuit,
wherein the modulator circuit comprises a control circuit and a load circuit connected in parallel with the receiving coil, the load circuit having a switching device connected in series with an impedance modulating capacitor, and the control circuit switches the load circuit switching device ON and OFF in accordance with battery information,
wherein the modulator circuit switches the switching device ON and OFF to transmit battery information to the charging pad, and
wherein the battery housing device further comprises a battery data detection circuit that detects internal battery information, the battery data detection circuit being connected between the internal battery and the modulator circuit.

2. The combination as cited in claim 1, wherein the detection circuit detects receiving coil impedance changes to detect battery information by voltage level changes in the transmitting coil.

3. The combination as cited in claim 1, wherein the detection circuit detects receiving coil impedance changes to detect battery information by current level changes in the transmitting coil.

4. The combination as cited in claim 1, wherein the detection circuit detects receiving coil impedance changes to detect battery information by changes in the current-voltage phase relation in the transmitting coil.

5. The combination as cited in claim 1 wherein the detection circuit detects receiving coil impedance changes to detect battery information by transmission efficiency changes in the transmitting coil.

6. The combination as cited in claim 1, wherein the battery housing device further comprises a series capacitor connected in series with the receiving coil.

7. The combination as cited in claim 1 wherein the battery housing device transmits battery information to the charging pad that includes battery voltage during charging.

8. The combination as cited in claim 1, wherein the battery housing device transmits battery information to the charging pad that includes battery charging current.

9. The combination as cited in claim 1, wherein the battery housing device transmits battery information to the charging pad that includes battery temperature during charging.

10. The combination as cited in claim 1, wherein the battery housing device transmits battery information to the charging pad that includes the serial number of the battery.

11. The combination as cited in claim 1, wherein the battery housing device transmits battery information to the charging pad that includes the allowable charging current that sets the charging current for the battery.

12. The combination as cited in claim 1, wherein the device housing a battery transmits battery information to the charging pad that includes the allowable temperature that controls charging.

13. The combination as cited in claim 1, wherein the battery housing device further comprises a rectifying circuit that rectifies AC power induced in the receiving coil from the transmitting coil, and the load circuit is connected to an input-side of the rectifying circuit.

14. The combination as cited in claim 13, wherein the rectifying circuit is a synchronous rectifying circuit.

15. The combination as cited in claim 13, wherein the rectifying circuit is a diode-bridge circuit.

16. The combination as cited in claim 1, wherein the load circuit further comprises a pair of series-connected switching devices, and an impedance modulating capacitor connected in series with each of the switching devices;
wherein a connection node between the pair of switching devices is connected to a ground line, and the pair of switching devices is simultaneously controlled ON and OFF by the control circuit.

17. The combination as cited in claim 6, wherein the battery housing device is configured with a single capacitor serving as both the series capacitor and the impedance modulating capacitor; and the switching device switches the capacitor to act as the series capacitor or the impedance modulating capacitor.

18. The combination as cited in claim 17, wherein the single capacitor is connected between the receiving coil and a rectifying circuit, and the switching device implements a shorting circuit that short circuits the rectifying circuit side of the single capacitor.

19. The combination as cited in claim 1, wherein the switching device is a photo-transistor that switches ON and OFF via light.

20. A combination of a battery housing device and a charging pad, wherein:
the battery housing device comprises an internal battery and a receiving coil that supplies charging power to the internal battery;
the charging pad comprises a transmitting coil that magnetically couples with the receiving coil of the battery housing device and supplies charging power,
the battery housing device further comprises a modulator circuit that modulates the impedance of the receiving coil in accordance with internal battery information,
the charging pad further comprises a detection circuit that detects battery information via the transmitting coil by detecting receiving coil impedance changes made by the modulator circuit,
the modulator circuit comprises a control circuit and a load circuit connected in parallel with the receiving coil, the load circuit having a switching device connected in series with an impedance modulating capacitor, the control circuit switches the load circuit switching device ON and OFF in accordance with battery information,
the modulator circuit switches the switching device ON and OFF to transmit battery information to the charging pad,
the charging pad further comprises:
a case having a charging region capable of receiving the battery housing device in a removable manner;
a moving mechanism that moves the transmitting coil to a position in close proximity to the receiving coil; and
a position detection controller that determines the position of the receiving coil in the battery housing device placed on the charging region and controls the moving mechanism to move the transmitting coil close to the receiving coil in the battery housing device,
wherein the position detection controller further comprises position detection coils disposed at a side of an inner surface of a top plate of the case, a detection signal generating circuit that supplies position detection signals to the position detection coils, a receiving circuit that receives echo signals output from the receiving coil to the position detection coils due to excitation of the receiving coil by position detection signals supplied to the position detection coils from the detection signal generating circuit, and a discrimination circuit that determines receiving coil position from the echo signals received by the receiving circuit,
wherein the battery housing device further comprises a rectifying circuit connected to the receiving coil that converts AC induced in the receiving coil to DC to supply the internal battery with charging power, and a series capacitor connected in series with the receiving coil to input receiving coil AC to the rectifying circuit, and
wherein, when the position detection controller issues position detection signals, the modulator circuit control circuit switches the switching device ON to connect the impedance modulating capacitor to the receiving coil.

\* \* \* \* \*